US012003913B2

United States Patent
Xue et al.

(10) Patent No.: US 12,003,913 B2
(45) Date of Patent: Jun. 4, 2024

(54) EAR-WORN ELECTRONIC DEVICE INCORPORATING GESTURE CONTROL SYSTEM USING FREQUENCY-HOPPING SPREAD SPECTRUM TRANSMISSION

(71) Applicant: Starkey Laboratories, Inc., Eden Prairie, MN (US)

(72) Inventors: Dong Xue, Bloomington, MN (US); Zhenchao Yang, Eden Prairie, MN (US); Gregory J. Haubrich, Champlin, MN (US); Stephen Paul Flood, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 276 days.

(21) Appl. No.: 17/603,806

(22) PCT Filed: Oct. 27, 2020

(86) PCT No.: PCT/US2020/057519
§ 371 (c)(1),
(2) Date: Oct. 14, 2021

(87) PCT Pub. No.: WO2021/101674
PCT Pub. Date: May 27, 2021

(65) Prior Publication Data
US 2022/0217464 A1     Jul. 7, 2022

Related U.S. Application Data

(60) Provisional application No. 62/939,031, filed on Nov. 22, 2019.

(51) Int. Cl.
*H04R 1/10*     (2006.01)
*G06F 3/01*     (2006.01)
(Continued)

(52) U.S. Cl.
CPC ............ *H04R 1/1041* (2013.01); *G06F 3/017* (2013.01); *G06F 3/162* (2013.01); *G06F 3/165* (2013.01);
(Continued)

(58) Field of Classification Search
CPC .............. H04R 1/1041; H04R 2420/07; H04B 17/327; G06F 3/017; G06F 3/162; G06F 3/165
(Continued)

(56) References Cited

U.S. PATENT DOCUMENTS 7,764,798 B1 *  7/2010  Prather ................ H04R 25/554
                                                       381/23.1
7,843,425 B2   11/2010  Lu et al.
(Continued)

FOREIGN PATENT DOCUMENTS

| EP | 2731356 | 5/2014 |
|----|---------|--------|
| EP | 3508877 | 7/2019 |
| WO | 2015/054419 | 4/2015 |

OTHER PUBLICATIONS

Abdelnasser, 2015, "WiGest: A Ubiquitous Wifi-based Gesture recognition System".*
(Continued)

*Primary Examiner* — William A Jerez Lora
(74) *Attorney, Agent, or Firm* — Mueting Raasch Group

(57) ABSTRACT

A system comprises a first ear-worn electronic device configured to be worn by a wearer, and a second electronic device comprising a second ear-worn electronic device or other electronic device. A wireless transceiver operably coupled to an antenna is disposed in each of the electronic devices. One or both of the first ear-worn electronic device and the second electronic device are configured to transmit signals at a plurality of different frequencies in accordance with a frequency hopping sequence, collect 2-D RSSI data
(Continued)

comprising an RSSI value as a function of frequency and of time in response to transmission of the signals, detect a particular input gesture of a plurality of input gestures of the wearer using the 2-D RSSI data, and implement a predetermined function of at least one of the first ear-worn electronic device and the second electronic device in response to detecting the particular input gesture.

20 Claims, 13 Drawing Sheets

(51) Int. Cl.
*G06F 3/16* (2006.01)
*H04B 17/327* (2015.01)

(52) U.S. Cl.
CPC ....... *H04B 17/327* (2015.01); *H04R 2420/07* (2013.01)

(58) Field of Classification Search
USPC .............................. 381/23.1, 56, 58, 74, 312
See application file for complete search history.

(56) References Cited

U.S. PATENT DOCUMENTS

| | | | |
|---|---|---|---|
| 8,655,000 | B1 | 2/2014 | Solum et al. |
| 9,575,560 | B2 | 2/2017 | Poupyrev et al. |
| 2007/0149146 | A1 | 6/2007 | Hwang |
| 2012/0001875 | A1 | 1/2012 | Li et al. |
| 2012/0007692 | A1 | 1/2012 | Song |
| 2012/0121095 | A1* | 5/2012 | Popovski ............. H04R 25/552 381/23.1 |
| 2015/0242024 | A1 | 8/2015 | Majava |
| 2016/0080888 | A1 | 3/2016 | Kreitzer et al. |
| 2016/0100801 | A1 | 8/2016 | Clark et al. |
| 2016/0259421 | A1 | 9/2016 | Gollakota |
| 2017/0060269 | A1 | 3/2017 | Förstner et al. |
| 2018/0157330 | A1 | 6/2018 | Gu |
| 2019/0110140 | A1* | 4/2019 | Dickmann ........... H04R 25/552 |
| 2019/0208456 | A1* | 7/2019 | Mofidi ................. H04W 40/02 |
| 2019/0212436 | A1 | 7/2019 | Baheti |
| 2019/0243458 | A1 | 8/2019 | Wang |
| 2021/0133399 | A1* | 5/2021 | Coelho De Souza ...................... G06F 3/04883 |
| 2022/0109925 | A1* | 4/2022 | Xue ..................... H04R 25/558 |
| 2022/0217464 | A1 | 7/2022 | Xue |

OTHER PUBLICATIONS

International Search Report and Written Opinion from PCT Application No. PCT/US2020/057519 dated Feb. 15, 2021, 10 pages.

Abdelnasser et al., "WiGest: A Ubiquitous WiFi-based Gesture Recognition System", arXiv: 1501.04301v2, May 18, 2015, 10 pages.

International Patent Application No. PCT/US2020/057519 filed Oct. 27, 2022, International Preliminary Report on Patentability dated May 17, 2022, 8 pages.

International Patent Application No. PCT/US2020/041951, filed Jul. 14, 2020, International Search Report and Written Opinion dated Nov. 3, 2020, 13 pages.

* cited by examiner

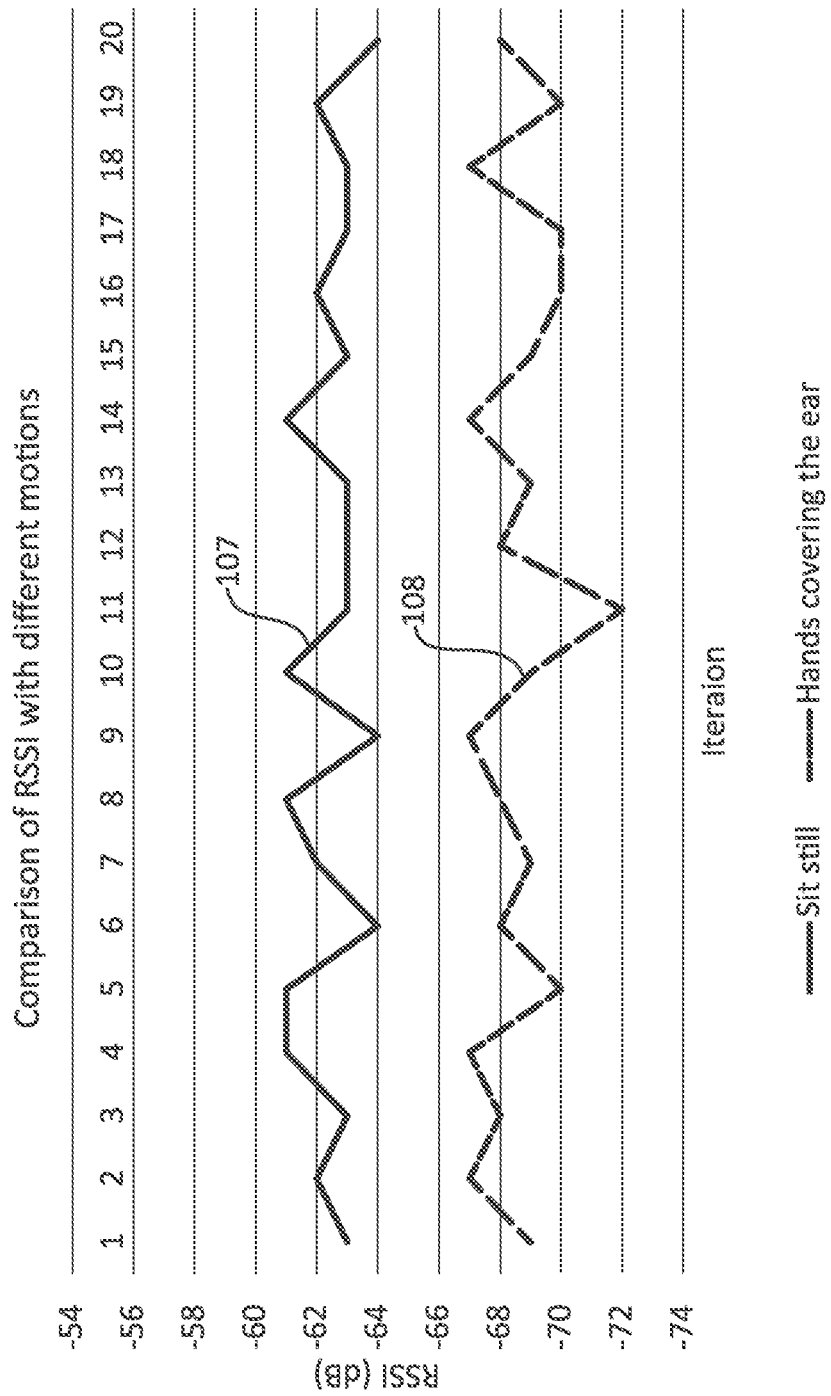

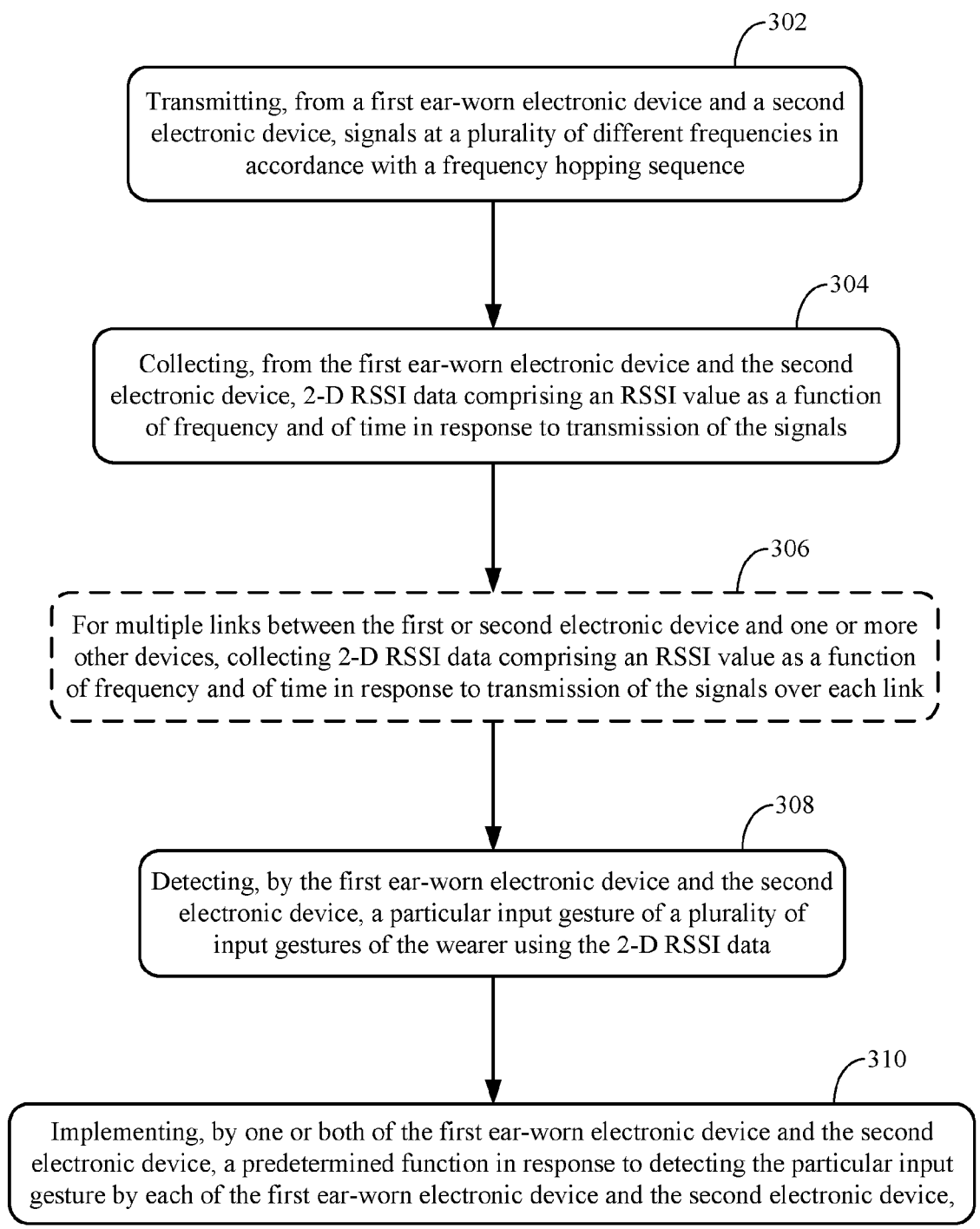

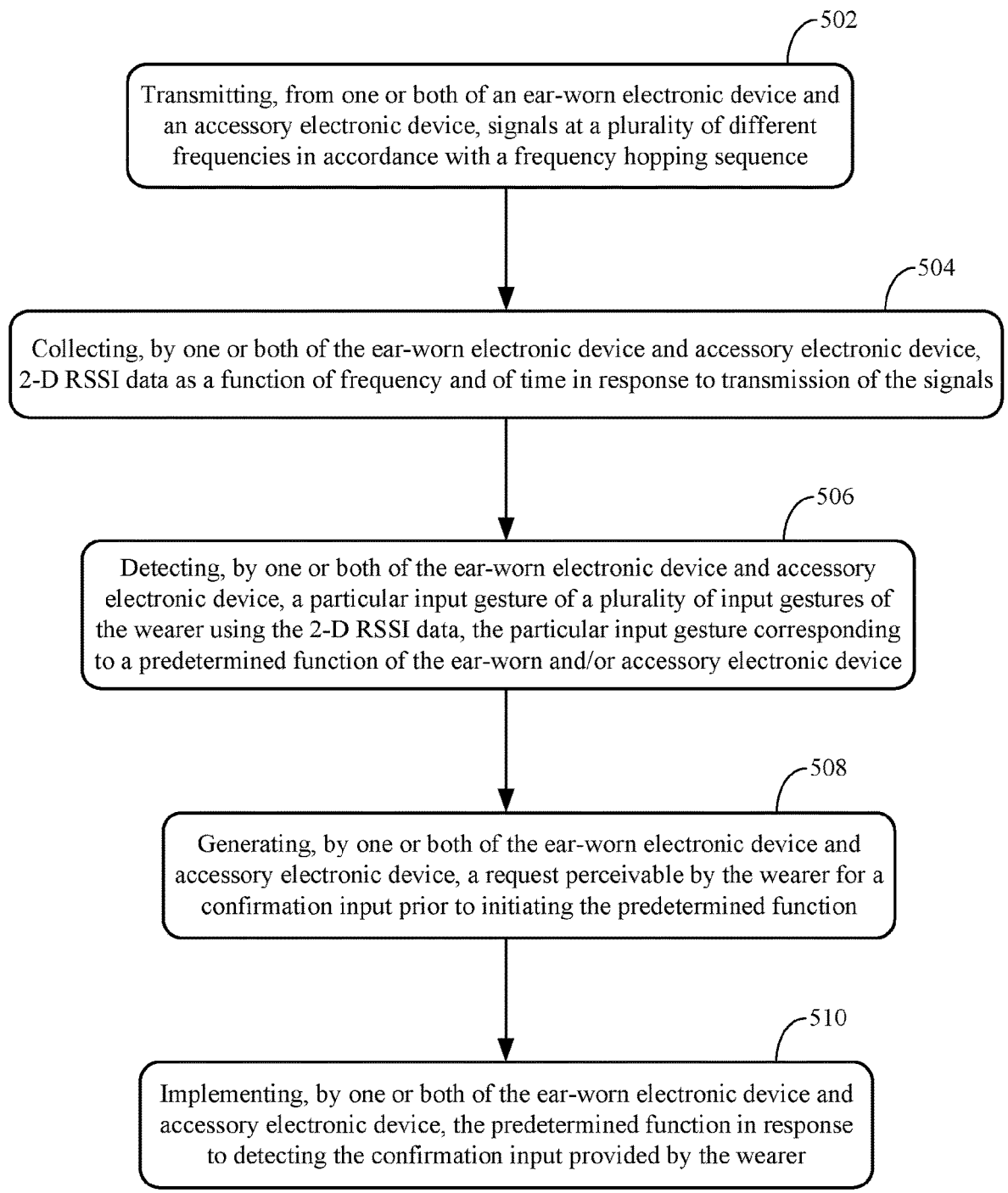

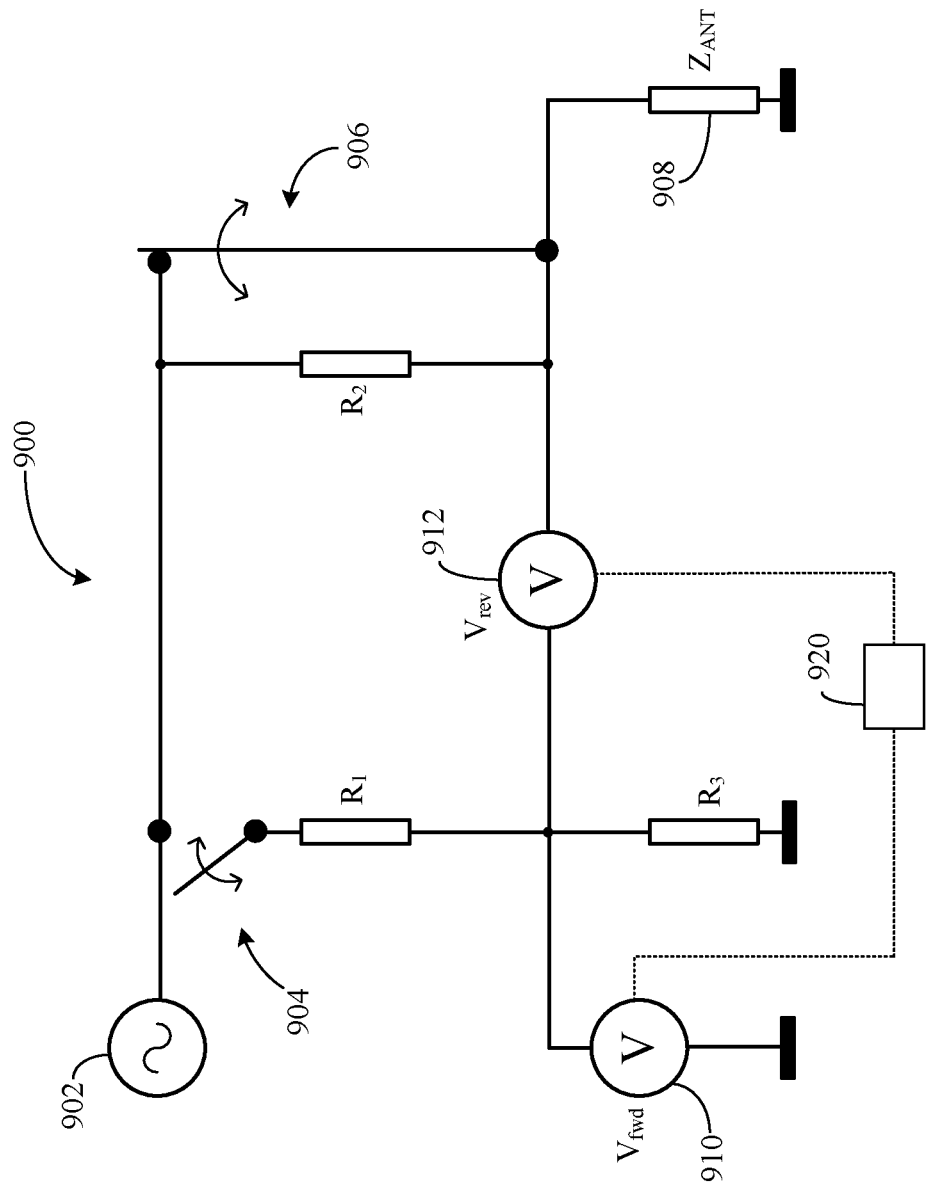

EAR-WORN ELECTRONIC DEVICE INCORPORATING GESTURE CONTROL SYSTEM USING FREQUENCY-HOPPING SPREAD SPECTRUM TRANSMISSION

RELATED PATENT APPLICATIONS

This application is a U.S. National Stage application under 35 U.S.C. 371 of PCT Application No. PCT/US2020/057519, filed Oct. 27, 2020, which claims priority to U.S. Provisional Application No. 62/939,031, filed Nov. 22, 2019, the contents of which are hereby incorporated by reference in their entireties.

TECHNICAL FIELD

This application relates generally to ear-worn electronic devices and/or accessories for ear-worn devices, including hearing devices, hearing aids, personal amplification devices, other hearables, smartphones, smart watches, remote microphones, physiologic sensors, and fitness and/or health monitoring devices and watches.

BACKGROUND

Hearing devices provide sound for the wearer. Some examples of hearing devices are headsets, hearing aids, speakers, cochlear implants, bone conduction devices, and personal listening devices. For example, hearing aids provide amplification to compensate for hearing loss by transmitting amplified sounds to a wearer's ear canals. Hearing devices may be capable of performing wireless communication with other devices, such as receiving streaming audio from a streaming device via a wireless link. Wireless communication may also be performed for programming the hearing device and transmitting information from the hearing device. For performing such wireless communication, hearing devices such as hearing aids can include a wireless transceiver and an antenna.

SUMMARY

Embodiments are directed to a method using a first ear-worn electronic device worn by a wearer and wirelessly coupled to at least a second electronic device. Each of the electronic devices comprises a wireless transceiver operably coupled to an antenna. The method comprises transmitting, from one or both of the first ear-worn electronic device and the second electronic device, signals at a plurality of different frequencies in accordance with a frequency hopping sequence. The method also comprises collecting, from one or both of the first ear-worn electronic device and the second electronic device, two-dimensional (2-D) RSSI (Received Signal Strength Indication) data comprising an RSSI value as a function of frequency and of time in response to transmission of the signals. The method further comprises detecting a particular input gesture of a plurality of input gestures of the wearer using the 2-D RSSI data, and implementing a predetermined function of at least one of the first ear-worn electronic device and the second electronic device in response to detecting the particular input gesture.

Embodiments are directed to a system comprising a first ear-worn electronic device configured to be worn by a wearer, and a second electronic device comprising a second ear-worn electronic device or other electronic device. A wireless transceiver operably coupled to an antenna is disposed in each of the electronic devices. One or both of the first ear-worn electronic device and the second electronic device are configured to transmit signals at a plurality of different frequencies in accordance with a frequency hopping sequence, collect 2-D RSSI data comprising an RSSI value as a function of frequency and of time in response to transmission of the signals, detect a particular input gesture of a plurality of input gestures of the wearer using the 2-D RSSI data, and implement a predetermined function of at least one of the first ear-worn electronic device and the second electronic device in response to detecting the particular input gesture.

Embodiments are directed to a method using a first body-worn electronic device worn by a wearer and wirelessly coupled to at least a second electronic device, each of the electronic devices comprising a wireless transceiver operably coupled to an antenna. The method comprises transmitting, from one or both of the first body-worn electronic device and the second electronic device, signals at a plurality of different frequencies in accordance with a frequency hopping sequence. The method also comprises collecting, from one or both of the first body-worn electronic device and the second electronic device, two-dimensional (2-D) RSSI (Received Signal Strength Indication) data comprising an RSSI value as a function of frequency and of time in response to transmission of the signals. The method further comprises detecting a particular input gesture of a plurality of input gestures of the wearer using the 2-D RSSI data, and implementing a predetermined function of at least one of the first body-worn electronic device and the second electronic device in response to detecting the particular input gesture. In some configurations, the first body-worn electronic device is a first ear-worn electronic device, and the second electronic device is a second ear-worn electronic device. In other configurations, the first body-worn electronic device is an ear-worn electronic device, and the second electronic device is an accessory electronic device.

Embodiments are directed to a system comprising a first body-worn electronic device configured to be worn by a wearer, a second electronic device, and a wireless transceiver operably coupled to an antenna disposed in each of the electronic devices. One or both of the first body-worn electronic device and the second electronic device are configured to transmit signals at a plurality of different frequencies in accordance with a frequency hopping sequence, collect two-dimensional (2-D) RSSI (Received Signal Strength Indication) data comprising an RSSI value as a function of frequency and of time in response to transmission of the signals, detect a particular input gesture of a plurality of input gestures of the wearer using the 2-D RSSI data, and implement a predetermined function of at least one of the first body-worn electronic device and the second electronic device in response to detecting the particular input gesture. In some configurations, the first body-worn electronic device is a first ear-worn electronic device, and the second electronic device is a second ear-worn electronic device. In other configurations, the first body-worn electronic device is an ear-worn electronic device, and the second electronic device is an accessory electronic device.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIG. 1A is a graph showing a comparison of Received Signal Strength Indicator (RSSI) data for different wearer motions in accordance with any of the embodiments disclosed herein;

FIG. 3 illustrates a gesture control method using FHSS transmission implemented by one or both of an ear-worn electronic device and an accessory electronic device in accordance with any of the embodiments disclosed herein;

FIG. 5 illustrates a gesture control method using FHSS transmission implemented by one or both of an ear-worn electronic device and an accessory electronic device in accordance with any of the embodiments disclosed herein;

FIG. 9 illustrates a gesture control system of one or both of an ear-worn electronic device and an accessory electronic device that uses FHSS transmission implemented in accordance with any of the embodiments disclosed herein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1B:
FIGS. 1B and 1C show S21 magnitude curves for different wearer motions in accordance with any of the embodiments disclosed herein.

It is understood that the embodiments described herein may be used with any body-worn electronic device and accessories of a body-worn electronic device without departing from the scope of this disclosure. Representative body-worn electronic devices include ear-worn or ear-level electronic devices, including cochlear implants and bone conduction devices, and accessories for ear-worn electronic devices. The devices depicted in the figures are intended to demonstrate the subject matter, but not in a limited, exhaustive, or exclusive sense.

Ear-worn electronic devices (also referred to herein as "hearing devices"), such as hearables (e.g., wearable earphones, ear monitors, and earbuds), hearing aids, hearing instruments, and hearing assistance devices, typically include an enclosure, such as a housing or shell, within which internal components are disposed. Typical components of a hearing device can include a processor (e.g., a digital signal processor or DSP), memory circuitry, power management circuitry, one or more communication devices (e.g., one or more radios, a near-field magnetic induction (NFMI) device, one or more antennas, one or more microphones, and a receiver/speaker, for example. Hearing devices can incorporate a long-range communication device, such as a Bluetooth® transceiver or other type of radio frequency (RF) transceiver. A communication device (e.g., a radio or NFMI device) of a hearing device can be configured to facilitate communication between a left ear device and a right ear device of the hearing device.

Hearing devices of the present disclosure can incorporate an antenna coupled to a high-frequency transceiver, such as a 2.4 GHz radio. The RF transceiver can conform to an IEEE 802.11 (e.g., WiFi®) or Bluetooth® (e.g., Bluetooth® Low Energy (BLE), Bluetooth® 4.2, 5.0, 5.1, 5.2 or later) specification, for example. It is understood that hearing devices of the present disclosure can employ other transceivers or radios, such as a 900 MHz radio. Hearing devices of the present disclosure can be configured to receive streaming audio (e.g., digital audio data or files) or non-audio data from an electronic or digital source. Representative electronic/digital sources (e.g., accessory electronic devices) include an assistive listening system, a TV streamer, a radio, a smartphone, a laptop, a cell phone/entertainment device (CPED) or other electronic device that serves as a source of digital audio data or other types of data files.

Hearing devices of the present disclosure can be configured to communicate with a wide range of accessory electronic devices, such a remote microphone (e.g., a remote microphone array) and various sensors. Representative accessory electronic devices include a wide variety of physiologic sensors and motion/position sensors, including sensors and sensor systems that sense for and/or monitor one or any combination of heart rate, heart rhythms, heart rate variability, heart mechanical activity (e.g., heart sounds, seismocardiogram, SCG), heart electrical activity (electrocardiogram, ECG), respiration, sleep stage, snoring, sleep apnea, posture (e.g., sleeping position, such as left, right, prone, supine via an accelerometer), oxygen saturation (e.g., via a pulse oximeter), brain activity (e.g., electroencephalogram, EEG), muscle activity (e.g., electromyogram, EMG), glucose level, blood pressure, body temperature (e.g., core temperature), and nerve activity.

Hearing devices of the present disclosure can be configured to effect bi-directional communication (e.g., wireless communication) of data with an external source, such as a remote server via the Internet or other communication infrastructure. Hearing devices that include a left ear device and a right ear device can be configured to effect bi-directional communication (e.g., wireless communication via a radio or NFMI device) therebetween, so as to implement ear-to-ear communication between the left and right ear devices.

The term hearing device of the present disclosure refers to a wide variety of ear-level electronic devices that can aid a person with impaired hearing. The term hearing device also refers to a wide variety of devices that can produce processed sound for persons with normal hearing. Hearing devices of the present disclosure include hearables (e.g., wearable earphones, headphones, earbuds, virtual reality headsets), hearing aids (e.g., hearing instruments), cochlear implants, and bone-conduction devices, for example. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a "hearing device," which is understood to refer to a system comprising a single left ear device, a single right ear device, or a combination of a left ear device and a right ear device.

The term accessory electronic device of the present disclosure refers to a wide variety of electronic devices capable of communicating with a body-worn electronic device, such as a hearing device. A body-worn electronic device may be an accessory electronic device of a hearing device (and vice versa). Representative accessory electronic devices include neck loops (e.g., audio induction or RF loops), remote microphones (e.g., clip-on mics, pen mics), wireless streamers such as TV streamers and audio players, remote control devices, portable and desktop chargers for charging hearing devices, assistive listening systems, CPEDs, cell phone hot spot/streaming devices, TVs, and a variety of consumer electronic devices (e.g., smart speakers such as Alexa® devices). Representative accessory electronic devices also include handheld or desktop radios, smartphones, tablets, phablets, laptops, desktop computers, personal digital assistants (PDAs) and other consumer electronic devices capable of communicating with a hearing device. Representative accessory electronic devices further include fitness, health, and life style monitoring devices such as sensors, watches or other wrist worn, body worn or hand-held objects, e.g., Apple Watch®, Fitbit®, cell phones and smartphones with monitoring apps, handheld radios, medical devices including body worn and implantable devices, wireless capable helmets (e.g., used in professional football), and wireless headsets/headphones (e.g., virtual reality headsets).

Monitoring of human body motions and intuitive user control interfaces attract great interest in hearing devices. Currently, inertial measurement sensors (IMUS) are used for motion detection, and touch sensing technologies (e.g., Infrared Receiver—IR sensor) are widely used for human-computer user control interfaces. However, these sensors add space, cost, power consumption, and design complexity to hearing devices and accessory electronic devices. For current implementations of hearing device user interfaces, for example, not only switches or touch-sensors are needed, but also remote controls or apps are required. These can be costly and add hardware/software complexity. It is challenging to make discreet user adjustments for a hearing device. Typically, a push-button on the hearing device, a remote control, or a smartphone app is required. The buttons on a hearing device can be difficult to use. Since these are often quite noticeable to others, a more discreet method of adjustment is desirable. A gesture-based detection facility can make control of the hearing device much easier and provide for a more discreet method of interacting with the hearing device.

According to any of the embodiments disclosed herein, detection of perturbations in electromagnetic wave propagation is exploited to provide for human motion recognition and gesture control for hearing devices and/or accessory electronic devices. For example, the variation in an electromagnetic signal received by a hearing device and/or an accessory electronic device (e.g., by a hearing device of hearing device system or a hearing device and/or accessory electronic device of a body area network) serves as a sensor for detecting user motion and discerning control/input gestures from such motion. The electromagnetic signals received by a hearing device and/or accessory electronic device (e.g., via an app detecting gestures and forwarding gesture input/control signals to the hearing device) vary as the user is performing gestures or other body activities. Characteristics of the propagating wave perturbations can be extracted by the hearing device and/or accessory electronic device to classify different user motions or gestures. As such, users can track their daily activities, as well as control their hearing devices and/or accessory electronic devices wirelessly. This new sensing methodology can be implemented with lower cost, power consumption, and design complexity compared to current approaches that utilize physical sensors, and reduces the falsing rate when combined with other hearing and/or accessory electronic device sensors. It is noted that falsing can refer to a false positive or a false negative. A false positive refers to detection of a gesture when a gesture did not occur. A false negative refers to not detecting a gesture when a gesture did occur.

The creeping wave has been identified as a dominant electromagnetic wave propagation mechanism on a curved surface between two different materials. The human head can be considered as a proximity sphere filled with inhomogeneous tissue properties. The antenna on one side of a hearing device emits electromagnetic waves. The electromagnetic wave decays exponentially as it travels around the head, forming a 'creeping wave' phenomenon. As the human head or other body parts move (e.g., hand or finger movement near the ears), this movement perturbs the creeping wave which causes corresponding variations in the signal received by the receiving hearing device. Embodiments of the disclosure exploit the perturbation of the creeping wave for detecting and characterizing movement and gestures of a hearing device wearer.

Most movement by a person can perturb the creeping wave, providing an indication (e.g., a gesture). The movement can be detected and a signature associated with normal movement can be subtracted in the detection algorithm, thereby reducing false detection of a gesture. Further, detection of repetitive movement can be used for a step count or other health monitoring functionality. In addition to perturbing the creeping wave, a person's detectable movement may also be due to changes in "body shadowing" of non-creeping wave propagation changes.

Embodiments of the disclosure are directed to sensing changes in a parameter indicative of a transmission scattering parameter (e.g., S21, S12) by a pair of wirelessly coupled hearing devices or one or two hearing devices and at least one wirelessly coupled accessory electronic device due to movement by a wearer of the hearing device. Embodiments are directed to determining that a sensed change in the parameter indicative of the transmission scattering parameter corresponds to a particular input gesture of the wearer and implementing a predetermined function of the hearing device(s) and/or the accessory electronic device(s) in response to the particular input gesture.

It has been found by the inventors that RSSI can serve as a surrogate parameter indicative of the S21 or S12 transmission coefficient in the context of wearer motion recognition and gesture control of one or two hearing devices and/or accessory electronic device(s). RSSI is generally understood to be a measurement of the power present in a received radio signal. In the context of wireless communications, RSSI is the relative received signal strength in a wireless environment, and is usually referenced in units of dB or dBm. RSSI is an indication of the power level being received by the receive radio after the antenna and connection loss. As such, higher RSSI numbers correspond to stronger signals. RSSI values are typically integers represented in a negative form (e.g. −100), the closer the value is to 0, the stronger the received signal has been.

RSSI has been found to have a large dynamic range for detecting relatively small wearer movements, such as finger gestures, in addition to gross wearer movements (e.g., walking or jogging). The large dynamic range of RSSI is exploited by gesture control systems of the present disclosure, which provides for more sensitive detection of hand, finger, and head gestures made by the hearing device wearer. It is noted that in some embodiments, the received channel power indicator (RCPI) can be used to serve as a surrogate parameter indicative of the S21 or S12 transmission coefficient in the context of wearer motion recognition and gesture control of one or two hearing devices and/or accessory electronic device(s). RCPI is an IEEE 802.11 measure of the received radio frequency power in a selected channel over the preamble and the entire received frame.

The ear-to-ear transmission data (RSSI data as a surrogate for S21 data) can be collected from antennas of left and right hearing devices, for example. The hearing device wearer can perform head movements such as shaking, nodding and rotating. Gestures such as tapping and waving can also be performed by the wearer. As the wearer is moving, the complex transmission RSSI data is collected with continuous time mode with a sampling rate. It can be observed that both magnitude and phase of the RSSI data exhibit unique periodic patterns that differ with different activities. This is due to the reason that as the human head or other body parts moves, the head/body part interacts with the creeping wave channel so the receiving signal varies accordingly.

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1. A system, comprising a first ear-worn electronic device configured to be worn by a wearer, a second electronic device comprising a second ear-worn electronic device or other electronic device, and a wireless transceiver operably coupled to an antenna disposed in each of the electronic devices. One or both of the first ear-worn electronic device and the second electronic device are configured to transmit signals at a plurality of different frequencies in accordance with a frequency hopping sequence, collect two-dimensional (2-D) RSSI (Received Signal Strength Indication) data comprising an RSSI value as a function of frequency and of time in response to transmission of the signals, detect a particular input gesture of a plurality of input gestures of the wearer using the 2-D RSSI data, and implement a predetermined function of at least one of the first ear-worn electronic device and the second electronic device in response to detecting the particular input gesture.

Example Ex2. The system according to Ex1, wherein the second electronic device comprises the second ear-worn electronic device, the 2-D RSSI data comprises ear-to-ear 2-D RSSI data measured by one or both of the first and second ear-worn electronic devices, the particular input gesture of the wearer is detected by one or both of the first and second ear-worn electronic devices using the ear-to-ear 2-D RSSI data, and the predetermined function is implemented by one or both of the first and second ear-worn electronic devices in response to detecting the particular input gesture.

Example Ex3. The system according to Ex1, wherein the second electronic device comprises the second ear-worn electronic device which is configured to transmit the signals at the plurality of different frequencies in accordance with the frequency hopping sequence, and the first ear-worn electronic device is configured to collect the 2-D RSSI data, detect the particular input gesture using the 2-D RSSI data, and implement the predetermined function in response to detecting the particular input gesture.

Example Ex4. The system according to Ex1, wherein the first ear-worn electronic device is configured to transmit the signals at the plurality of different frequencies in accordance with the frequency hopping sequence, the second electronic device comprises an accessory electronic device, and the accessory electronic device is configured to collect the 2-D RSSI data and detect the particular input gesture using the 2-D RSSI data.

Example Ex5. The system according to Ex4, wherein the accessory electronic device is configured to (a) implement the predetermined function in response to detecting the particular input gesture or (b) transmit a signal to one or both of the first ear-worn electronic device and the second ear-worn electronic device in response to detecting the particular input gesture, wherein one or both of the first ear-worn electronic device and the second ear-worn electronic device is configured to implement the predetermined function in response to the signal transmitted by the accessory electronic device.

Example Ex6. The system according to any of the preceding claims, wherein the first ear-worn electronic device and a plurality of second electronic devices collectively define a hearing system network comprising a plurality of wireless links, the 2-D RSSI data is collected from each of the wireless links, and the particular input gesture is detected by one or more of the electronic devices defining the hearing system network using the 2-D RSSI data collected from one or more of the wireless links.

Example Ex7. The system according to Ex1, wherein the second electronic device comprises the second ear-worn electronic device, one or both of the first and second ear-worn electronic devices implements the predetermined function in response to detecting the particular input gesture, and the predetermined function comprises one or both of detecting and tracking one or more of a physiologic signal, a physiologic condition or a personal habit of the wearer.

Example Ex8. The system according to one or more of Ex1 to Ex7, wherein one or both of the first ear-worn electronic device and the second electronic device are configured to detect the particular input gesture by comparing the collected 2-D RSSI data to reference 2-D RSSI data indicative of the plurality of input gestures, wherein the reference 2-D RSSI data is stored in a memory of one or both of the first the ear-worn electronic device and the accessory electronic device or in a memory of an external server communicatively coupled to one or both of the first ear-worn electronic device and the accessory electronic device.

Example Ex9. The system according to one or more of Ex1 to Ex8, wherein one or both of the first ear-worn electronic device and the second electronic device are configured to collect, from one or both of the first ear-worn electronic device and the second electronic device, 2-D reflection coefficient data as a function of frequency and of time in response to transmission of the signals, detect the particular input gesture of the wearer using one of the 2-D RSSI data and the 2-D reflection coefficient data, and confirm, by at least one of the first ear-worn electronic device and the second electronic device, successful detection of the particular input gesture using the other of the 2-D RSSI data and the 2-D reflection coefficient data.

Example Ex10. The system according to one or more of Ex1 to Ex9, wherein one or both of the first ear-worn electronic device and the second electronic device are configured to generate a request perceivable by the wearer for a confirmation input prior to initiating the predetermined function, and implement the predetermined function in response to detecting the confirmation input provided by the wearer;

Example Ex11. A method using a first ear-worn electronic device worn by a wearer and wirelessly coupled to at least a second electronic device, each of the electronic devices comprising a wireless transceiver operably coupled to an antenna, the method comprising transmitting, from one or both of the first ear-worn electronic device and the second electronic device, signals at a plurality of different frequencies in accordance with a frequency hopping sequence, collecting, from one or both of the first ear-worn electronic device and the second electronic device, two-dimensional (2-D) RSSI (Received Signal Strength Indication) data comprising an RSSI value as a function of frequency and of time in response to transmission of the signals, detecting a particular input gesture of a plurality of input gestures of the wearer using the 2-D RSSI data, and implementing a predetermined function of at least one of the first ear-worn electronic device and the second electronic device in response to detecting the particular input gesture.

Example Ex12. The method according to Ex11, wherein the second electronic device comprises a second ear-worn electronic device, the 2-D RSSI data comprises ear-to-ear 2-D RSSI data measured by one or both of the first and second ear-worn electronic devices, the particular input gesture of the wearer is detected by one or both of the first and second ear-worn electronic devices using the ear-to-ear 2-D RSSI data, and the predetermined function is implemented by one or both of the first and second ear-worn electronic devices in response to detecting the particular input gesture.

Example Ex13. The method according to Ex11, wherein the first ear-worn electronic device transmits the signals at the plurality of different frequencies in accordance with the frequency hopping sequence, the second electronic device comprises an accessory electronic device, the accessory electronic device collects the 2-D RSSI data and detects the particular input gesture using the 2-D RSSI data, and (a) the accessory electronic device implements the predetermined function in response to detecting the particular input gesture or (b) the accessory electronic device transmits a signal to one or both of the first ear-worn electronic device and the second ear-worn electronic device in response to detecting the particular input gesture, and one or both of the first ear-worn electronic device and the second ear-worn electronic device implements the predetermined function in response to the signal transmitted by the accessory electronic device.

Example Ex14. The method according to one or more of Ex11 to Ex13, wherein detecting the particular input gesture comprises comparing the collected 2-D RSSI data to reference 2-D RSSI data indicative of the plurality of input gestures, and the reference 2-D RSSI data is received from (a) a memory of one or both of the first the ear-worn electronic device and the accessory electronic device or (b) a memory of an external server communicatively coupled to one or both of the first ear-worn electronic device and the accessory electronic device.

Example Ex15. The method according to one or more of Ex11 to Ex14, comprising generating a request perceivable by the wearer for a confirmation input prior to initiating the predetermined function, and implementing the predetermined function in response to detecting the confirmation input provided by the wearer.

Reference is made to FIG. 1A, which provides a comparison of RSSI data for different wearer motions. An experiment was performed in which a human subject was sitting in an open area wearing two hearing aids. Ear-to-ear RSSI data was recorded wirelessly using an app, for motionless and motion (both hands covering and uncovering ears) scenarios. The experimental result is shown in FIG. 1A. Curve 107 shows RSSI data for the motionless scenario. Curve 108 shows RSSI data for the motion scenario. It was found that the ear-to-ear RSSI data changed within a range of about 4 to 9 dB due to the motion. Also, the RSSI data of curve 108 shows a periodical pattern as the human subject is performing the motion of covering and uncovering his ears periodically. The data points were gathered from FHSS transmission/reception. Many channel frequencies are represented in each iteration of the data.

Figure 1C:

An experiment was performed using a phantom head with antennas placed on the left and right ears of the phantom head. The antennas were connected via coaxial cables to a Vector Network Analyzer (Keysight N5230C). A hand was positioned to cover the left ear antenna, to simulate a gesture. The results are shown in FIGS. 1B and 1C. It was found that the S21 magnitude had a large variation between the non-covered state (FIG. 1B) and the covered (FIG. 1C) state. It was also found that S21 at each frequency point had different variations for each motion state, respectively.

Any of the embodiments of a gesture control system disclosed herein find particular usefulness within the context of radiofrequency communication techniques that employ frequency hopping. According to any of the embodiments disclosed herein, an FHSS system can be incorporated in a hearing device, an accessory electronic device or devices, or both hearing and accessory electrical devices to provide a method for detecting gestures made by the hearing device wearer. For hearing devices and accessory electronic devices that utilize a Bluetooth® protocol, for example, the frequency hops rapidly in accordance with a frequency hopping sequence. Multiple devices can have a Bluetooth® connection with the hearing device. Each connection will have a frequency hopping sequence. A combined frequency hopping sequence of all connections to the hearing device can be managed by the hearing device's gesture detection and control circuitry. Gestures made by a hearing device wearer can correspond to user inputs to one or both of the hearing device and the accessory electronic device(s), including command inputs, setting inputs, function selection inputs, function deselection inputs, verification inputs, etc. An FHSS system incorporated in a hearing device and/or an accessory electronic device(s) can also provide a training system which can be implemented to determine the RSSI pattern or signature for each gesture that corresponds to a hearing device and/or accessory electronic device user input.

A gesture control system and method according to any of the embodiments disclosed herein can be used to classify wearer gestures, such as hand or finger motions made in proximity to the hearing device and/or the accessory electronic device(s). It is noted that the gesture detection circuitry can be placed in a left hearing device, a right hearing device or both left and right hearing devices for purposes of detecting wearer gestures. Gesture detection circuitry can also be placed in one or more accessory electronic devices that communicate with the hearing device(s). Gesture detection circuitry can be configured to detect and characterize one or more of changes in an ear-to-ear RSSI pattern, changes in an ear-to-accessory RSSI pattern, and changes in a plurality of ear-to-accessory RSSI patterns.

As the wearer's finger, hand or head moves, the RSSI pattern is perturbed, which can be detected by one or both of the hearing devices and/or the accessory electronic device(s). For example, when a wearer performs hand or finger motions (e.g. waving, swipe, tap, holds, zoom, circular movements, etc.), at least one of the hearing devices and/or the accessory electronic device(s) records the RSSI. As the wearer's finger, hand, head or body moves during performance of particular gestures, the changes in the RSSI data show unique patterns. Each of these unique RSSI patterns or signatures, when detected, correspond to a hearing device and/or accessory electronic device user input. For example, a state machine or other mechanism can be configured to track perturbation of the RSSI pattern(s). Tracking perturbation of the RSSI pattern(s) can be used to track walking, head movement, etc.

According to any of the embodiments disclosed herein, the patterns of a wearer gesture consist of two-dimensional (2-D) RSSI signals, in both time domain and frequency domain, that is, RSSI vs. frequency and RSSI vs. time (also referred to herein as 2-D RSSI data). A gesture control system of the hearing device and/or an accessory electronic device processes, analyzes, and monitors the 2-D RSSI data to detect wearer gestures. After detecting (and optionally verifying) a wearer gesture, the gesture control system informs a processor of the hearing device and/or the accessory electronic device that an input gesture has been received. In response, the processor can implement a particular hearing device and/or accessory electronic device function or setting that corresponds to the detected input gesture.

It is understood that a single link (e.g., BLE link) between a hearing device and a second device (e.g., an accessory electronic device) creates a 2-D space. However, the hearing device can have multiple connections associated with multiple accessory electronic devices. For example, an accessory electronic device placed in the wearer's pocket will be associated with signal perturbations associated with walking (link 1). A link (link 2) between the hearing device and a wrist-worn device will detect arm movement. An ear-to-ear link (link 3) will detect the movement of a gesture and possibly some additional body movement. The additional body movement of link 1 can be characterized for cadence and other characteristics. This can be correlated with link 2.

A state machine can be configured to keep track of the 2-D space associated with each link. The information of link 1 can be shared with other links to null out detection of the same cadence, removing or reducing the probability for a false signal. As previously discussed, a false signal can be a false positive or a false negative. The method of comparing the multiple links improves performance of both false positives and false negatives.

For example, the processor of the hearing device and/or an accessory electronic device monitors 2-D RSSI data to detect a wearer gesture that corresponds to one of a multiplicity of reference gestures developed for the wearer and/or for a population. The reference gestures can be stored in a memory of the hearing device, the accessory electronic device(s), and/or in cloud storage. After the 2-D RSSI data is collected by the hearing device and/or the accessory electronic device(s), time-frequency analysis can be performed by the hearing device processor, the accessory electronic device processor, and/or a cloud processor to evaluate the feature differences between each wearer gesture. For example, a time-frequency spectrogram can be generated and analyzed by the hearing device processor, accessory electronic device processor, and/or cloud processor to detect a wearer gesture. The time-frequency spectrogram can be a two-dimensional figure describing the frequency spectrum variation of the RSSI data with time. Several signal processing techniques can be applied, including a Fast Fourier transform (FFT) and a continuous wavelet transform (CWT). In some embodiments, a dynamic time warping (DTW) algorithm or function can be applied to the RSSI data to assess the similarity between the collected RSSI data and reference RSSI data corresponding to any number of predetermined wearer gestures. In other embodiments, an autocorrelation of the collected 2-D RSSI data indicative of a gesture signal with a stored 2-D RSSI data signature of the gesture can be performed by the processor of the hearing device and/or an accessory electronic device. The results of the autocorrelation can be used to assess the similarity between the collected RSSI data and reference RSSI data corresponding to any number of predetermined wearer gestures.

A gesture control system of a hearing device and/or an accessory electronic device implemented in accordance with any of the embodiments disclosed herein is configured to collect and process 2-D RSSI data in both time domain and frequency domain. By gathering RSSI data in both time domain and frequency domain, the gesture information detected by the hearing device and/or accessory electronic device(s) is significantly more reliable than conventional gesture detection approaches. Collecting and processing 2-D RSSI data in both time domain and frequency domain by a gesture control system according to any of the embodiments disclosed herein significantly increases gesture detection accuracy and significantly reduces gesture detection challenges due to frequency-hopping variations.

When a hand or finger of the wearer (or other individual) moves near the hearing device, for example, it is not necessary that the hand or finger touch the hearing device since the electromagnetic wave travels wirelessly. As a practical matter, the wearer's hand or finger would not directly touch the antenna since the antenna may be packed and sealed within the hearing device. As the wearer's hand or finger moves closer to the hearing device, a large perturbation of the antenna's electrical field occurs, resulting in a corresponding larger variation in the antenna's transmission scattering parameter (e.g., S21, S12) and, therefore, the corresponding 2-D RSSI data. Within a certain distance between the hand/finger and hearing device, as long as the wearer is performing a specific motion, the 2-D RSSI data pattern should be consistent, although the absolute value would likely be different due to signal decay along the distance. This non-contacting gesture detection method has a great advantage over a touch sensor since the wearer's hand/finger does not necessarily need to touch the hearing device to interact with the device.

As discussed previously, 2-D RSSI data can be collected to characterize (e.g., develop signatures for) a multiplicity of gestures for one or more populations. The 2-D RSSI data signatures can be developed for a multiplicity of finger, hand, and head motions for an individual wearer, one or more populations, or a combination of an individual wearer and one or more populations. Each of these 2-D RSSI data signatures serves as a reference signal or reference signature (e.g., reference 2-D RSSI data). Each reference 2-D RSSI data signature corresponds to a particular input gesture of a multiplicity of input gestures that can be detected by the hearing device and/or accessory electronic device processor. The reference 2-D RSSI data can be pre-selected and stored in a memory of the hearing device, the accessory electronic device(s), and/or in cloud storage accessible by the hearing device and/or the accessory electronic device(s). The collected 2-D RSSI data can be post-processed using learning algorithms or statistical modeling. The trained data can then be compared with the reference 2-D RSSI data signature to determine whether or not event triggering is implemented.

A correlation or pattern recognition methodology can be implemented by the processor of the hearing device, the processor of an accessory electronic device, and/or a cloud processor when comparing a detected gesture to a reference gesture. A representative methodology for comparing detected and reference gestures involves computing a correlation coefficient and comparing the result to a threshold indicative of a match. The reference gestures can be stored in cloud storage and updated by a multiplicity of hearing device wearers (one or more populations) and/or accessory electronic devices over time. Updated reference gestures can be periodically downloaded from cloud storage to individual hearing devices and/or accessory electronic devices to provide for improved gesture detection.

The processor of the hearing device, the processor of the accessory electronic device(s), and/or a cloud processor may be configured to apply self-learning algorithms to adjust thresholds/signatures to improve (e.g., optimize) detection while reducing (e.g., minimizing) falsing. It is noted that falsing refers to a processor or decoder assuming that it is detecting a valid input when one is not present. Falsing is also known as a false decode. Additionally, the wearer can customize his or her motion/gesture to align with a specific setting or function for wearer control. Gesture or motion training can be implemented either pre-embedded in the hearing device and/or accessory electronic device(s) or conducted by the wearer (or both). For example, fitting software for the hearing device or a mobile application executed by a smartphone or tablet can be used to assist in gesture training. An adaptive algorithm can be implemented to sense nominal conditions vs. gestures/motions. An app can be used to assist hearing device wearers in training gestures (e.g. voice assistance).

According to any of the disclosed embodiments, an adaptive learning algorithm can be configured to compare signals detected across a plurality of links. This comparison can be used to determine given links that might have variation with walking or other non-gesture related body movement. Remnants of non-gestures may be detected in the signal. The adaptive learning algorithm can be configured to remove non-gesture related signal detection, thereby reducing false gesture detection.

A falsing reading detection feature implemented by a hearing device processor, an accessory electronic device processor, and/or a cloud processor may be used by the wearer. For example, a mobile application or well characterized finger gesture can be used to indicate a falsing reading. A voice keyword detection function may also be used for a falsing reading detection. An audible feedback mechanism may assist the wearer to confirm the accuracy of a gesture input prior to altering a hearing device and/or an accessory electronic device setting or implementing a hearing device/accessory electronic device function. For example, when a wearer is attempting to use his or her motion or gesture to control the hearing device and/or an accessory electronic device, the wearer can perform a sample movement (e.g., finger flickering). Placing a hand over the hearing device or an accessory electronic device in a given pattern can be used to trigger the hearing device system to learn a new gesture. This may be associated with a verbal acknowledgement/indication by the hearing device. The hearing device and/or an accessory electronic device can generate a voice or tonal message requesting the wearer to confirm the setting (e.g., volume up) or command (e.g., connect hearing device with a streaming device). This wearer input verification feature serves to increase reliability and robustness against falsing.

Figure 1D:
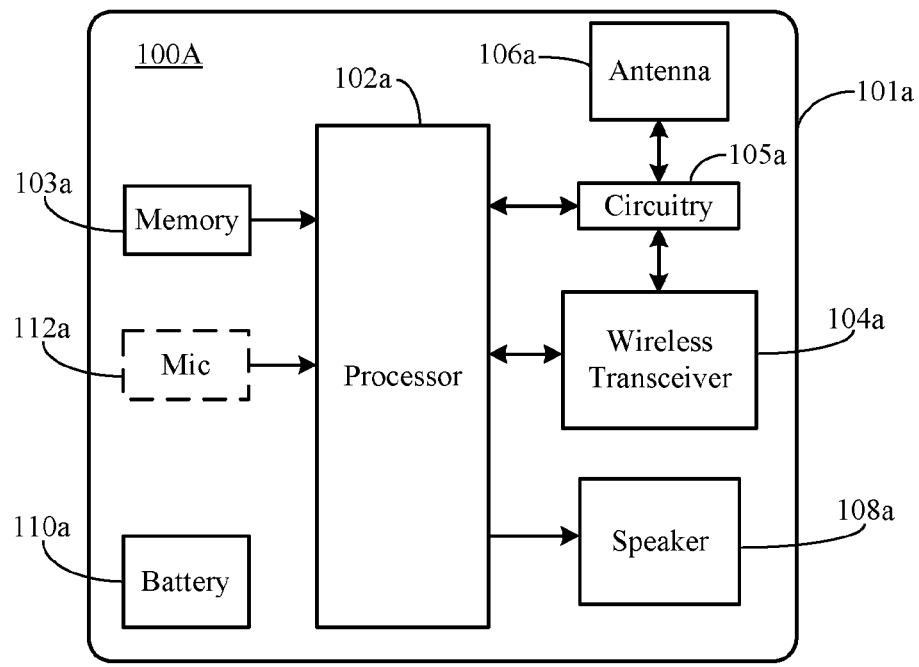
FIGS. 1D and 1E illustrate an ear-worn electronic device arrangement incorporating a gesture detection and device control system in accordance with any of the embodiments disclosed herein.
Figure 1E:
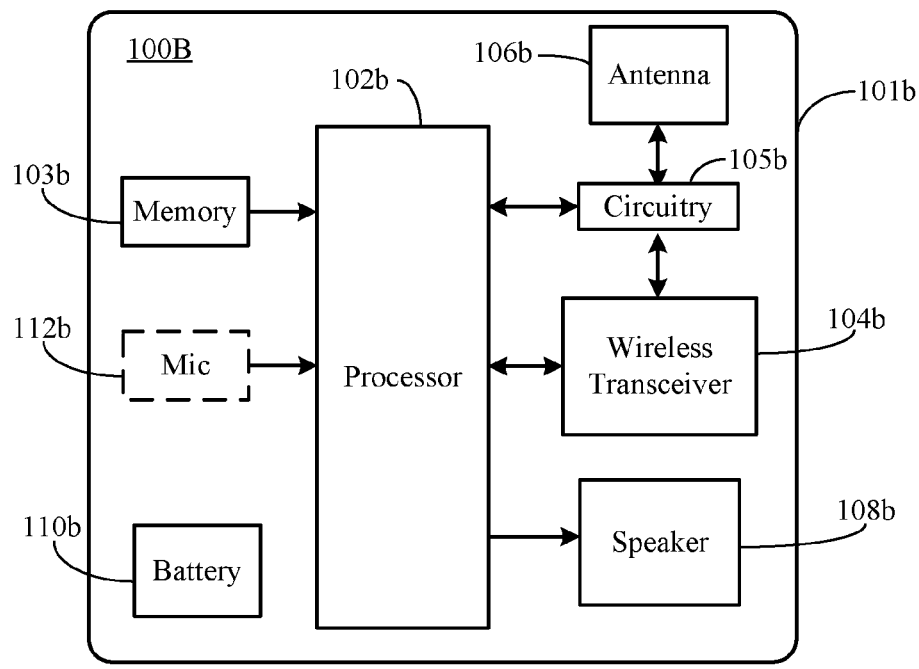

FIGS. 1D and 1E illustrate various components of a representative hearing device arrangement in accordance with various embodiments. FIGS. 1D and 1E illustrate first and second hearing devices 100A and 100B configured to be supported at, by, in or on left and right ears of a wearer. In some embodiments, the first and second hearing devices 100A, 100B are configured to cooperatively implement a gesture detection and control methodology of the present disclosure. In other embodiments (e.g., see FIG. 1F), one or both of the first and second hearing devices 100A and 100B and one or more accessory electronic devices are configured to cooperatively implement a gesture detection and control methodology of the present disclosure.

For example, oftentimes, an accessory electronic device (e.g., smartphone running an app) may be located in a wearer's pants pocket allowing for gestures to be detected near the accessory electronic device. The wearer may be wearing a smart watch on his or her wrist, allowing for gestures to be detected near the smart watch and, if applicable, a smartphone in the wearer's pants pocket. This provides for much more discreet gesture control (e.g., especially if the wearer is seated at a table). This also provides for a reduction in falsing.

In accordance with any of the disclosed embodiments, any combination of the first and/or second hearing devices 100A and 100B and one or more other electronic accessory devices 152 (e.g., smartphone, smart watch, health or fitness monitoring device/watch) can be referred to as a hearing system network. The various electronic devices that define a hearing system network can support a multiplicity of wireless links therebetween, each of which has a frequency hopping sequence. A gesture control system of a hearing system network (implemented by any one or a combination of connected electronic devices) is configured to collect and process 2-D RSSI data in both time domain and frequency domain for each communication link. By gathering RSSI data in both time domain and frequency domain for each link, the gesture information detected by the electronic devices defining the hearing system network is significantly more reliable than conventional gesture detection approaches. Collecting and processing 2-D RSSI data in both time domain and frequency domain for each link by a gesture control system of a hearing system network significantly increases gesture detection accuracy, reduces falsing, and can provide a more discreet way to control hearing system network devices. A wearer input (e.g., device command or setting) corresponding to a detected gesture can be forwarded from a device that detects the gesture to the appropriate device in the hearing system network for execution/implementation.

As illustrated in FIGS. 1D and 1E, the first and second hearing devices 100A and 100B include the same functional components. It is understood that the first and second hearing devices 100A and 100B can include different functional components. The first and second hearing devices 100A and 100B can be representative of any of the hearing devices disclosed herein.

The first and second hearing devices 100A and 100B include an enclosure 101a, 101b configured for placement, for example, over or on/about the ear, or in the ear canal (e.g., entirely or partially within the external ear canal, such as between the pinna and ear drum) or behind the ear. Disposed within the enclosure 101a, 101b is a processor 102a, 102b which incorporates or is coupled to memory 103a, 103b. The processor 102a, 102b can include or be implemented as a multi-core processor, a digital signal processor (DSP), an audio processor or a combination of these processors. For example, the processor 102a, 102b may be implemented in a variety of different ways, such as with a mixture of discrete analog and digital components that include a processor configured to execute programmed instructions contained in a processor-readable storage medium (e.g., solid-state memory, e.g., Flash). Often, the wireless transceiver 104a, 104b will include a processor or multiple processors and memory.

The processor 102a, 102b is coupled to a wireless transceiver 104a, 104b (also referred to herein as a radio), such as a BLE, 802.11, or other wireless transceiver. The wireless transceiver 104a, 104b is operably coupled to an antenna 106a, 106b configured for transmitting and receiving radio signals. The antenna 106a, 106b is disposed in, on, or extends from the enclosure 101a, 101b. The wireless transceiver 104a, 104b and the antenna 106a, 106b can be configured to operate in the 2.4 GHz ISM frequency band or other applicable communication band (referred to as "Bluetooth® band" herein). The wireless transceiver 104a, 104b and antenna 106a, 106b can be configured to enable ear-to-ear communication between the two hearing devices 100A and 100B, as well as communications with an external device (e.g., a smartphone or a digital music player).

The wireless transceiver 104a, 104b is configured to implement a frequency hopping methodology, such as frequency-hopping spread spectrum (FHSS), for transmission of radio signals. FHSS transmission involves the repeated switching of frequencies during radio transmission to reduce interference and avoid interception. FHSS is useful to counter eavesdropping, to obstruct jamming of telecommunications, and to minimize the effects of unintentional interference. According to an FHSS transmission methodology, the transmitter of the wireless transceiver 104a, 104b hops between available narrowband frequencies within a specified broad channel in a pseudo-random sequence or other sequence known to both sender and receiver. For example, the transmitter can hop to a new frequency more than twice per second. A short burst of data is transmitted on the current narrowband channel for a predetermined period of time (e.g., hop or dwell time), then the transmitter and receiver tune to the next frequency in the sequence for the next burst of data. Because no channel is used for long period of time, and the odds of any other transmitter being on the same channel at the same time are low, FHSS is often used as a method to allow multiple transmitter and receiver pairs to operate in the same frequency space on the same broad channel at the same time.

For ear-to-ear communication, one of the wireless transceivers 104a, 104b typically serves as a master and the other wireless transceivers 104a, 104b serves as a slave. For non-ear-to-ear communication, both of the wireless transceivers 104a, 104b typically serve as a slave and the processor of an accessory electronic device serves as the master. The master always transmits first followed by transmission by the slave. Because of this master-slave relationship, both hearing devices 100A, 100B do not perform the RSSI measurement at exactly the same time. However, the RSSI measurements are performed nearly simultaneously, allowing for near-real-time gesture detection and classification. The wireless transceiver 104a, 104b can be capable of having multiple concurrent connections. The connections can be to different accessory electronic devices or to another hearing device.

The first and second hearing devices 100A and 100B include circuitry 105a, 105b coupled to the antenna 106a, 106b, wireless transceiver 104a, 104b, and processor 102a, 102b. The circuitry 105a and/or circuitry 105b is configured to measure ear-to-ear RSSI in response to signals transmitted by one or both of the wireless transceivers 104a, 104b at a plurality of different frequencies in accordance with a frequency hopping sequence. One or both of the processors 102a, 102b is configured to cooperate with its corresponding wireless transceiver 104a, 104b, antenna 106a, 106b, and circuitry 105a, 105b to collect 2-D RSSI data as a function of frequency and as a function of time (e.g., RSSI values vs. frequency and RSSI values vs. time) in response to transmission of the signals. One or both of the processors 102a, 102b can store the 2-D RSSI data in its corresponding memory 103a, 103b as a matrix of RSSI values as a function of time and of frequency. One or both of the processors 102a, 102b can be configured to perform time-frequency analysis on the 2-D RSSI data to detect a gesture by the wearer. After detecting the gesture, which may involve verification of the gesture by the wearer via a user input (e.g., a verification gesture), one or both of the processors 102a, 102b can implement an instruction to perform a predetermined function corresponding to the detected gesture. One or both of the processors 102a, 102b can implement a correlation algorithm to determine a match between a detected gesture and a reference gesture stored in memory 103a, 103b and/or in cloud storage. Reference gestures can be stored in a database, a table, a library, a dictionary or any other type of memory structure in the memory 103a, 103b and/or in cloud storage (e.g., remote server storage).

A battery 110a, 110b or other power source (rechargeable or conventional) is provided within the enclosure 101a, 101b and is configured to provide power to the various components of the hearing devices 100A and 100B. If the battery 110a, 110b is a rechargeable battery, the hearing devices 100A and 100B include charging circuitry (not shown) configured to cooperate with a charging unit to implement a charging process to charge the battery 110a, 110b. A speaker or receiver 108a, 108b is coupled to an amplifier (not shown) and the processor 102a, 102b. The speaker or receiver 108a, 108b is configured to generate sound which is communicated to the wearer's ear.

In some embodiments, the hearing devices 100A and 100B include a microphone 112a, 112b mounted on or inside the enclosure 101a, 101b. The microphone 112a, 112b may be a single microphone or multiple microphones, such as a microphone array. The microphone 112a, 112b can be coupled to a preamplifier (not shown), the output of which is coupled to the processor 102a, 102b. The microphone 112a, 112b receives sound waves from the environment and converts the sound into an input signal. The input signal is amplified by the preamplifier and sampled and digitized by an analog-to-digital converter of the processor 102a, 102b, resulting in a digitized input signal. In some embodiments (e.g., hearing aids), the processor 102a, 102b (e.g., DSP circuitry) is configured to process the digitized input signal into an output signal in a manner that compensates for the wearer's hearing loss. When receiving an audio signal from an external source, the wireless transceiver 104a, 104b may produce a second input signal for the DSP circuitry of the processor 102a, 102b that may be combined with the input signal produced by the microphone 112a, 112b or used in place thereof. In other embodiments, (e.g., hearables), the processor 102a, 102b can be configured to process the digitized input signal into an output signal in a manner that is tailored or optimized for the wearer (e.g., based on wearer preferences). The output signal is then passed to an audio output stage that drives the speaker or receiver 108a, 108b, which converts the output signal into an audio output.

Figure 1F:
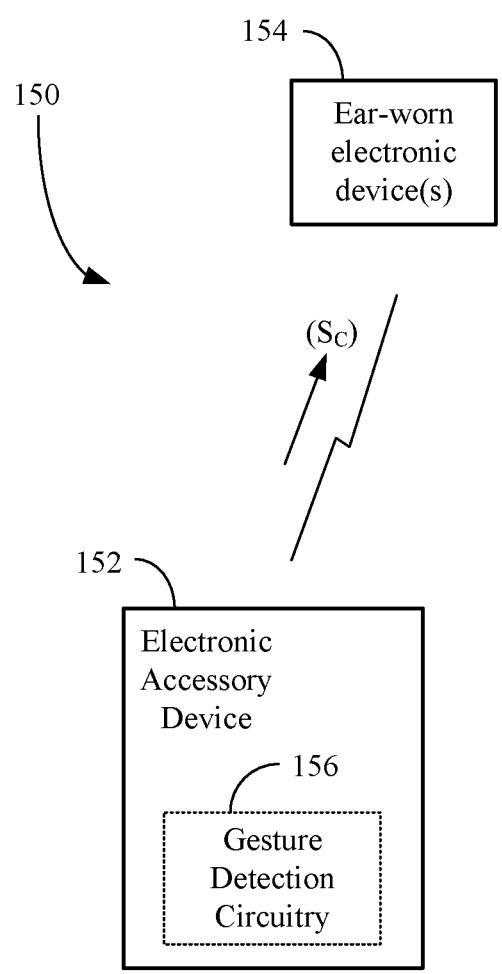
FIG. 1F illustrates a system which includes one or more accessory electronic devices configured to wirelessly couple to an ear-worn electronic device or devices, the accessory electronic devices configured to include gesture detection circuitry configured to implement a gesture detection method in accordance with any of the embodiments disclosed herein.

FIG. 1F illustrates a system 150 which includes an accessory electronic device or devices 152 configured to wirelessly couple to an ear-worn electronic device or devices 154. The accessory electronic device 152 is representative of any one or a combination of the electronic devices (e.g., communication devices, streaming devices), sensors (e.g., physiologic sensors), and fitness, health, and lifestyle monitoring devices disclosed herein. Each of these devices is represented by the system block diagram of FIGS. 1A and/or 1B, with the components of FIGS. 1A and 1B varying depending on the particular device implementation.

Each accessory electronic device 152 can be configured to include gesture detection circuitry 156. The gesture detection circuitry 156 of the accessory electronic device(s) 152 can be configured to implement a gesture detection method using FHSS transmission implemented in accordance with any of the embodiments disclosed herein. The gesture detection circuitry 156 is configured to detect an input gesture of a wearer of the ear-worn electronic device 154 in accordance with any of the methodologies disclosed herein (e.g., see FIGS. 2-7). In response to detecting a particular input gesture, the accessory electronic device(s) 152 implements a predetermined function or functions.

For example, in response to detecting a particular input gesture, the accessory electronic device 152 shown in FIG. 1F generates a control signal, Sc, which is communicated to the ear-worn electronic device 154. In response to receiving the control signal, Sc, the ear-worn electronic device 154 implements a device function corresponding to the wearer's input gesture (e.g., increase volume, send one of a plurality of messages). By way of further example, in response to detecting a particular input gesture, the ear-worn electronic device 154 generates the control signal, Sc, which is communicated to the accessory electronic device 152. In response to receiving the control signal, Sc, the accessory electronic device 152 implements a device function corresponding to the wearer's input gesture (e.g., initiate audio streaming).

The accessory electronic device(s) 152 and hearing device(s) 154 can operate cooperatively in accordance with any of the embodiments disclosed herein. For example, the accessory electronic device(s) 152 can transmit signals at a plurality of different frequencies in accordance with the frequency hopping sequence. The hearing device(s) 154 can collects 2-D RSSI data, detect a wearer input gesture using the 2-D RSSI data, and implement a predetermined function in response to detecting the input gesture.

In another example, one or both of the accessory electronic device(s) 152 and the hearing device(s) 154 can transmit signals at a plurality of different frequencies in accordance with the frequency hopping sequence, collect 2-D RSSI data, and detect a wearer input gesture using the 2-D RSSI data. In response to detecting the input gesture, the accessory electronic device(s) 152 can implement a predetermined function comprising one or both of detecting and tracking one or more of a physiologic signal, a physiologic condition or a personal habit of the wearer.

In addition to detecting wearer gestures, collected 2-D RSSI data can be used to detect if one of the wearer's two hearing devices falls off the wearer's head. If this occurs, the other hearing device on the head can generate a voice or vibration signal to alert the wearer of the fallen hearing device. Collected 2-D RSSI data can also be used to track the personal habits and/or health conditions of the wearer, such as eating speed and coughing times. In other words, collected 2-D RSSI data can not only track wearer motions, but also record vital/physiological signals. For example, the heartbeat rate, respiration rate, tremor, seizure sensing, body fidgeting or motions during sleep can be recorded. This would be beneficial for monitoring a patient's health conditions (e.g., epilepsy or sleep apnea) and/or keep track of a wearer's personal living habits.

For example, an accessory electronic device (e.g., a remote microphone) can be positioned near the wearer's chest so that heart and lung activity can be recorded. Both heart and lung activity are periodic and have different rates (e.g., different frequency ranges). As such, cardiac activity can be distinguished from lung activity using known filtering techniques. Changes in RSSI due to cardiac and lung activity can be recorded and analyzed. Atypical cardiac activity (arrhythmia) or pulmonary activity (e.g., sleep apnea, hypopnea) can be detected by the accessory electronic device or an external device (e.g., smartphone) communicatively coupled to the accessory electronic device. The wearer can be audibly alerted by an alert signal communicated from the accessory electronic device (or external device) and received by the hearing devices. An alert can also be transmitted from the accessory electronic device (or external device) to a remote system (e.g., clinician server).

Figure 2:
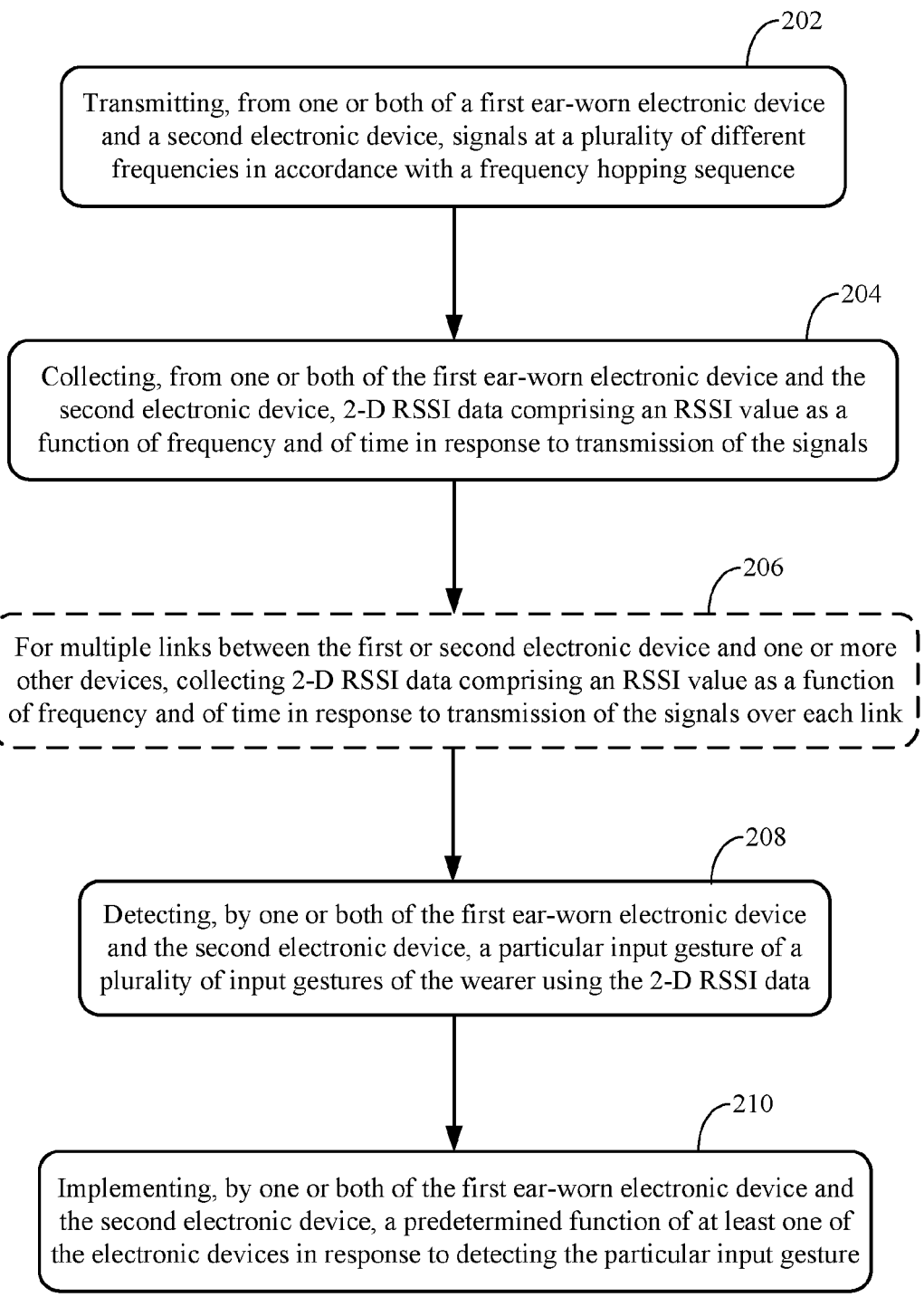
FIG. 2 illustrates a gesture control method using frequency-hopping spread spectrum (FHSS) transmission implemented by one or both of an ear-worn electronic device and an accessory electronic device in accordance with any of the embodiments disclosed herein.

FIG. 2 illustrates a gesture control method using FHSS transmission implemented by at least a first ear-worn electronic device and a second electronic device in accordance with any of the embodiments disclosed herein. The second electronic device can be a second ear-worn electronic device or an accessory electronic device(s) held by, worn on or situated proximate the wearer. The method shown in FIG. 2 involves transmitting 202, from one or both of the first ear-worn electronic device and the second electronic device, signals at a plurality of different frequencies in accordance with a frequency hopping sequence. As previously discussed, one or both of the first ear-worn electronic device and the second electronic device can have multiple concurrent connections. Each connection will have a hopping sequence. The frequency hopping sequence can include multiple concurrent hopping sequences for all connections that the electronic device(s) may have a wireless connection to.

The method involves collecting 204, from one or both of the first ear-worn electronic device and the second electronic device, 2-D RSSI data as a function of frequency and of time in response to transmission of the signals. For example, collecting the 2-D RSSI data can involve measuring the RSSI for each frequency of the frequency hopping sequence and at times at which each frequency of the frequency hopping sequence repeats. In some use scenarios, multiple links may be supported between the first ear-worn electronic device or the second electronic device and one or more other electronic devices (e.g., a smartphone carried in the wearer's pants pocket and/or a smart watch worn on the wearer's wrist). Each of these links has a frequency hopping sequence. For multiple links between the first or second electronic device and one or more other devices, the method can involve collecting 206 2-D RSSI data comprising an RSSI value as a function of frequency and of time in response to transmission of the signals over each link. The method also involves detecting 208, by one or both of the first ear-worn electronic device and the second electronic device, a particular input gesture of a plurality of input gestures of the wearer using the 2-D RSSI data. The method also involves implementing 210, by one or both of the first ear-worn electronic device and the second electronic device, a predetermined function of the device in response to detecting the particular gesture.

FIG. 3 illustrates a gesture control method using FHSS transmission implemented by at least a first ear-worn electronic device and a second electronic device in accordance with any of the embodiments disclosed herein. The second electronic device can be a second ear-worn electronic device or an accessory electronic device(s) held by, worn on or situated proximate the wearer. The method shown in FIG. 3 involves transmitting 302, from the first ear-worn electronic device and the second electronic device, signals at a plurality of different frequencies in accordance with a frequency hopping sequence. The method involves collecting 304, from the first ear-worn electronic device and the second electronic device, 2-D RSSI data as a function of frequency and of time in response to transmission of the signals. In some use scenarios, multiple links may be supported between the first ear-worn electronic device or the second electronic device and one or more other electronic devices (e.g., a smartphone carried in the wearer's pants pocket and/or a smart watch worn on the wearer's wrist). Each of these links has a frequency hopping sequence. For multiple links between the first or second electronic device and one or more other devices, the method can involve collecting 306 2-D RSSI data comprising an RSSI value as a function of frequency and of time in response to transmission of the signals over each link. The method also involves detecting 308, by the first ear-worn electronic device and the second electronic device, a particular input gesture of a plurality of input gestures of the wearer using the 2-D RSSI data. The method further involves implementing 310, by one or both of the first ear-worn electronic device and the second electronic device, a predetermined function in response to detecting the particular input gesture by each of the first ear-worn electronic device and the second electronic device.

Figure 4A:
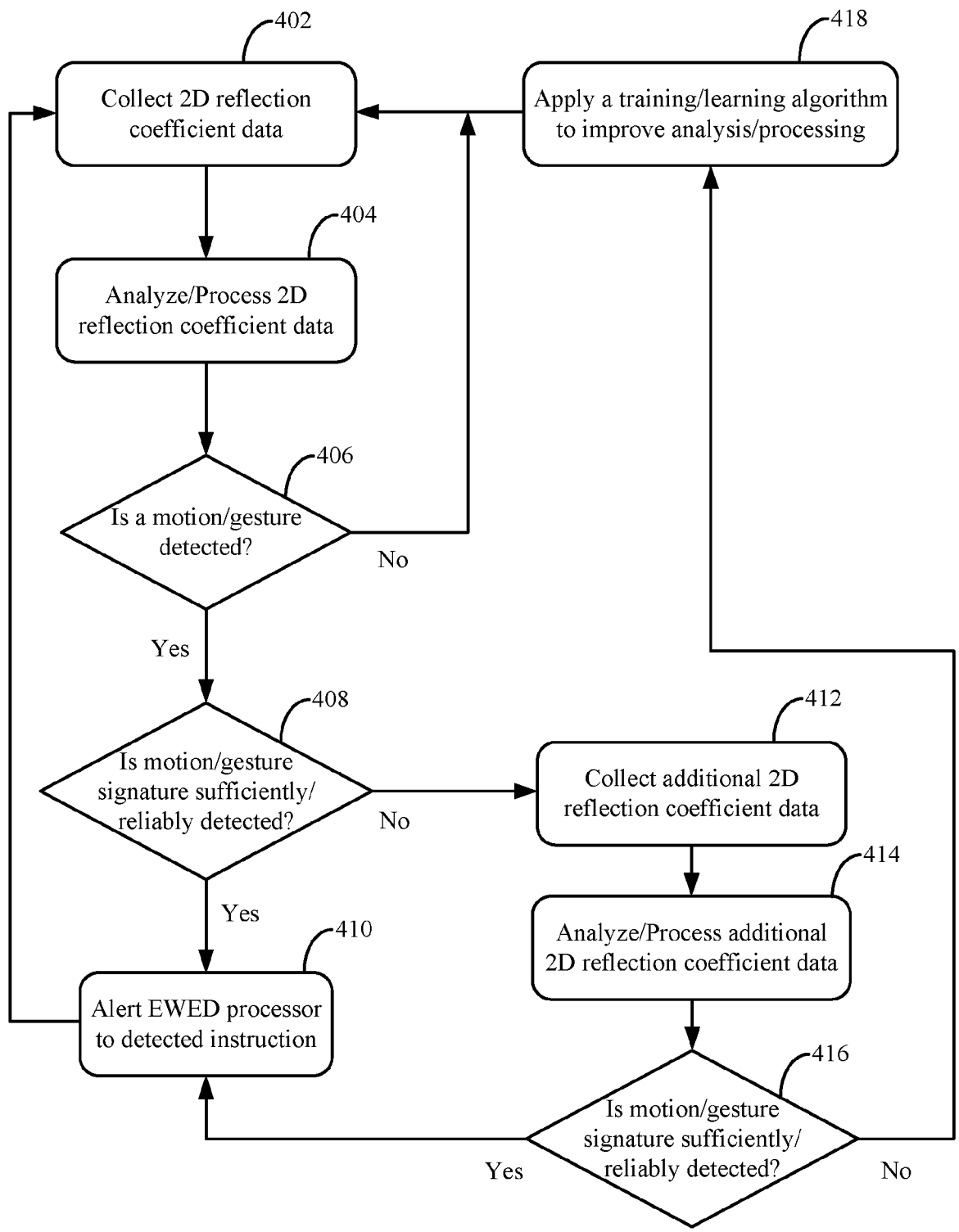
FIG. 4A illustrates a gesture control method using FHSS transmission implemented by one or both of an ear-worn electronic device and an accessory electronic device in accordance with any of the embodiments disclosed herein.

FIG. 4A illustrates a gesture control method using FHSS transmission implemented by one or both of an ear-worn electronic device and accessory electronic device(s) in accordance with any of the embodiments disclosed herein. The method shown in FIG. 4A involves collecting 402 2-D RSSI data by one or both of the ear-worn electronic device and accessory electronic device(s) as a function of frequency and of time as previously discussed. The method involves analyzing/processing 404 the 2-D RSSI data to determine if a motion/gesture has been detected 406. If a motion/gesture is not detected, processing returns to block 402 and the collection of 2-D RSSI data continues. If a motion/gesture is detected 406, a check is made 408 to determine if the motion/gesture signature has been sufficiently/reliably detected. For example, a check can be made to determine if the motion/gesture signature corresponds to an instruction for implementing a predetermined function of the ear-worn electronic device and/or the accessory electronic device(s). If so, the processor of the ear-worn electronic device (EWED) and/or the processor of the accessory electronic device(s) (AED) is alerted 410 to the detected instruction. Processing returns to block 402 to collect additional 2-D RSSI data for another gesture.

If, at block 408, it is determined that the motion/gesture signature has not been sufficiently/reliably detected, the method involves collecting 412 additional 2-D RSSI data and analyzing/processing 414 the additional 2-D RSSI data by one or both of the ear-worn electronic device and accessory electronic device(s) as an alternate or enhanced effort to detect a motion/gesture. This alternate or enhanced motion/gesture detection processing provides for more robust/reliable motion/gesture detection with less false detections of unintended motion/gestures. A check is made 416 to determine if the motion/gesture signature has been sufficiently/reliably detected. If so, the processor of the ear-worn electronic device and/or the processor of the accessory electronic device(s) is alerted 410 to the detected instruction. If not, the method involves applying 418 a training/learning algorithm by one or both of the ear-worn electronic device and accessory electronic device(s) to improve analysis/processing of the 2-D RSSI data. It is noted that any of the processes of FIG. 4A can be implemented by or in cooperation with a cloud processor, as previously discussed.

Figure 4B:
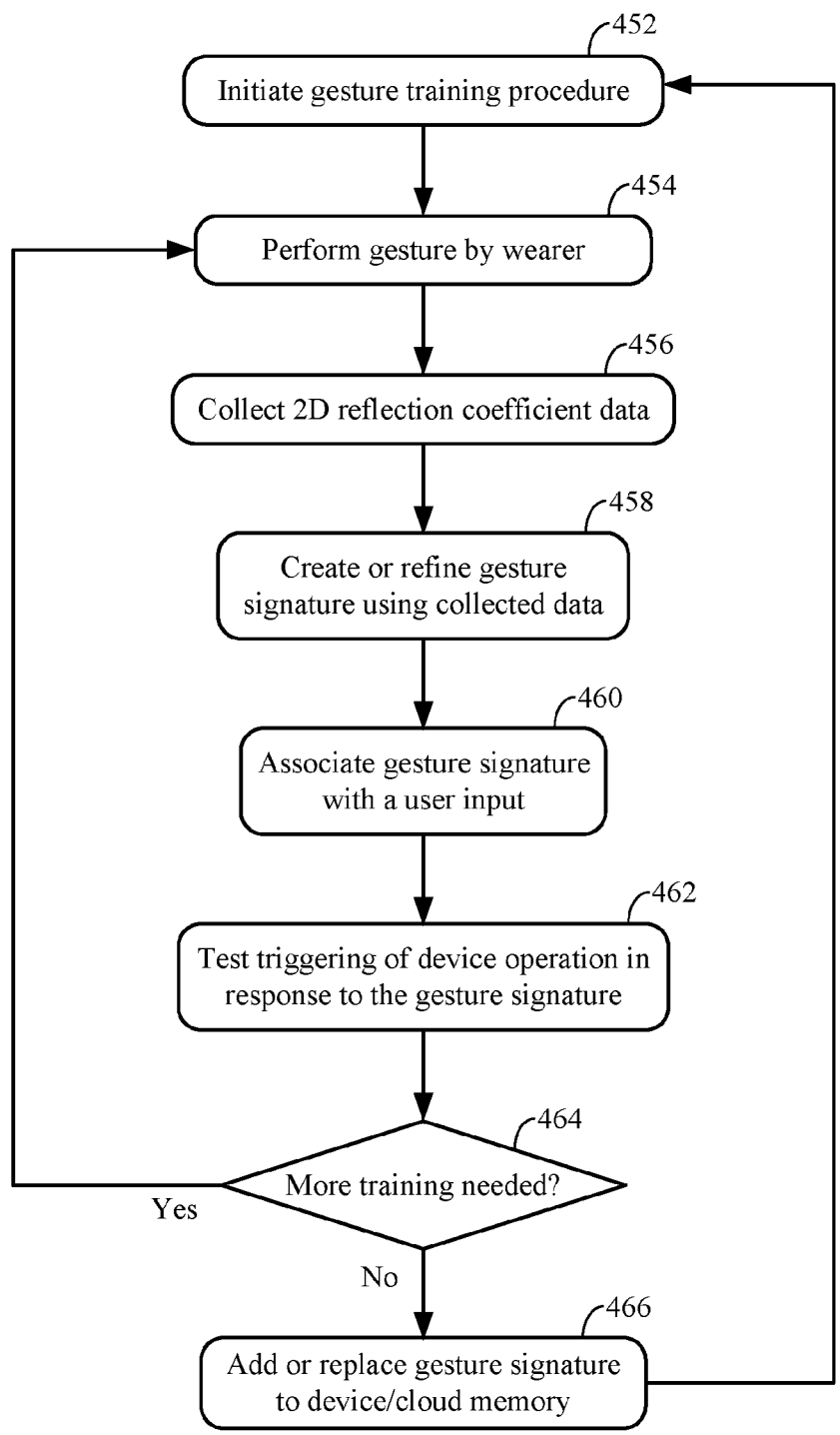
FIG. 4B illustrates a gesture training method implemented by one or both of an ear-worn electronic device and an accessory electronic device in accordance with any of the embodiments disclosed herein.

FIG. 4B illustrates a gesture training method implemented by one or both of the ear-worn electronic device and accessory electronic device(s) in accordance with any of the embodiments disclosed herein. The ear-worn electronic device and/or accessory electronic device(s) can incorporate a training system configured to determine the 2-D RSSI data pattern or signature for each gesture that corresponds to a hearing device and/or accessory electronic device user input. For example, the ear-worn electronic device and/or accessory electronic device(s) can incorporate a machine learning system configured to implement a training/learning algorithm. The machine learning system can be configured to implement a machine training/learning process using a deep neural network. As was previously discussed, gesture or motion training can be implemented either pre-embedded in the hearing device and/or accessory electronic device(s) or conducted by the wearer (or both). Fitting software for the hearing device or a mobile application executed by a smartphone or tablet can be used to assist in gesture training. An app can be used to assist hearing device wearers in training gestures.

The method shown in FIG. 4B involves initiating 452 a gesture training procedure by one or both of the ear-worn electronic device and accessory electronic device(s). The gesture training procedure can be initiated at any time, such as at the time of device manufacture, during fitting of the device, and/or at any time during use of the device by the wearer, a caregiver, a clinician or a technician. The training procedure involves performing 454 a gesture by the wearer, and collecting 456 2-D RSSI data by one or both of the ear-worn electronic device and accessory electronic device(s) during performance of the gesture. The method involves creating 458 a new (or refining an existing) gesture signature or pattern by one or both of the ear-worn electronic device and accessory electronic device(s) using the collected data, and associating 460 the gesture signature with a user input. The method also involves testing 462 triggering of a device operation in response to the gesture signature. If more training is needed 464 to further refine the gesture signature, the processes of blocks 454 through 462 can be repeated. If no more training is needed, the method involves adding or replacing 466 the gesture signature to one or more of the hearing device memory, accessory electronic device memory, and cloud memory. Processing returns to block 452 to provide for training of another gesture. It is noted that any of the processes of FIG. 4B can be implemented by or in cooperation with a cloud processor, as previously discussed.

It is understood that a particular user input to the hearing device and/or accessory electronic device(s) can be associated with a multi-gesture signature, in which two or more gestures define the particular user input. The gesture training method illustrated in FIG. 4B can be implemented to facilitate training of single and multiple wearer gestures.

In the context of any of the embodiments disclosed herein, a gesture can be defined by a single simple or complex wearer gesture or by a multiplicity of simple and/or complex wearer gestures. User inputs to a hearing device and/or accessory electronic device(s) comprising a multiplicity of wearer gestures increases the number of device functions that can be controlled with the gestures. For example, consider Table 1 below:

| Sequence | Gesture 1 | Gesture 2 | Gesture 3 | Function |
|---|---|---|---|---|
| 1 | A | A | A | 1 |
| 2 | A | A | B | 2 |
| 3 | A | B | A | 3 |
| 4 | A | B | B | 4 |
| 5 | B | A | A | 5 |
| 6 | B | A | B | 6 |
| 7 | B | B | A | 7 |
| 8 | B | B | B | 8 |

According to the representative example shown in Table 1 above, for N gestures in a sequence of M length, a total of NA$M$ device functions can be made available.

FIG. 5 illustrates a gesture control method using FHSS transmission implemented by one or both of an ear-worn electronic device and an accessory electronic device(s) in accordance with any of the embodiments disclosed herein. The method shown in FIG. 5 involves transmitting 502, from one or both of the ear-worn electronic device and the accessory electronic device(s), signals at a plurality of different frequencies in accordance with a frequency hopping sequence. The method involves collecting 504, by one or both of the ear-worn electronic device and accessory electronic device(s), 2-D RSSI data as a function of frequency and of time in response to transmission of the signals. The method also involves detecting 506, by one or both of the ear-worn electronic device and accessory electronic device(s), a particular input gesture of a plurality of input gestures of the wearer using the 2-D RSSI data, wherein the particular input gesture corresponds to a predetermined function of the ear-worn and/or accessory electronic device(s).

The method further involves generating 508, by one or both of the ear-worn electronic device and accessory electronic device(s), a request perceivable by the wearer (e.g., a particular tone, voice message, tactile output) for a confirmation input prior to initiating the predetermined function. For example, the request can comprise an audio request generated by the ear-worn electronic device and/or accessory electronic device(s). Additionally or alternatively, the request can comprise an audio, textual, graphical or tactile request generated by an external device communicatively coupled to the ear-worn electronic device (e.g., a smartphone, tablet or a mobile app on a smart device or other electronic device). The method also involves implementing 510, by one or both of the ear-worn electronic device and accessory electronic device(s), the predetermined function in response to detecting the confirmation input (e.g., a confirmation gesture, verbal confirmation input) provided by the wearer. It is noted that the confirmation input provided by the wearer may be used to further train the gesture discernment process, in addition to preventing actions on false gesture detection.

As was previously discussed, an ear-worn electronic device and/or an accessory electronic device can be configured with a gesture control system that provides for detection of more than one gesture that drives one response of the device. For example, a sequence of detected gestures can drive one or more responses. Furthermore, a multi-layer gesture driven menu of a "gesture user interface" (e.g., a GeUI) can be implemented to interactively interface via auditory feedback to the wearer of the ear-worn electronic device. A gesture user interface can provide for greater flexibility and ease of use (e.g., instead of touching a virtual button on a touch screen to descend to another control screen/menu). For example, a gesture can substitute for the virtual button, and the auditory feedback can prompt which subsequent gestures would elicit which responses (e.g., become an auditory equivalent to a touch-screen).

Figure 6:
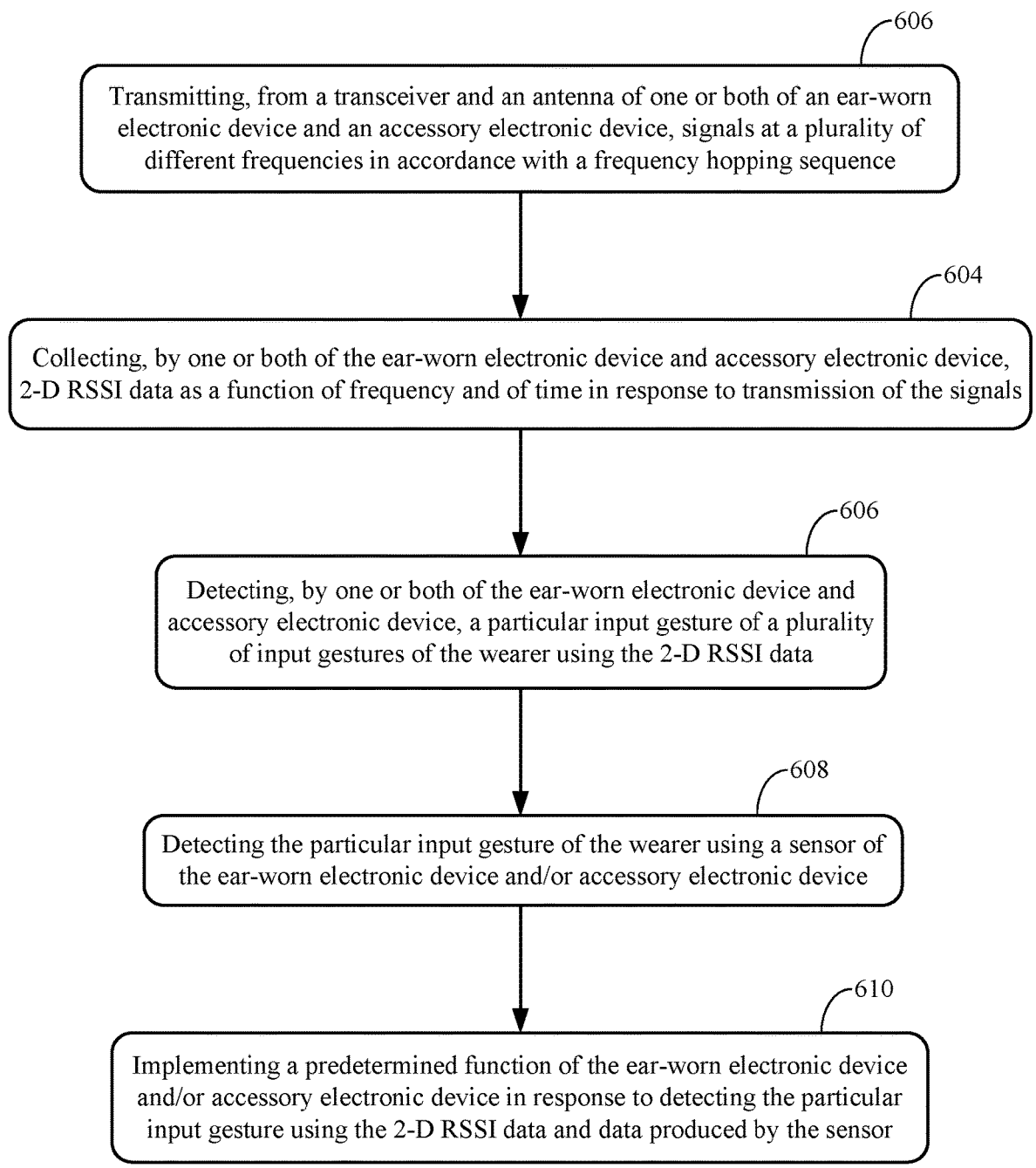
FIG. 6 illustrates a gesture control method using FHSS transmission implemented by a one or both of an ear-worn electronic device and an accessory electronic device in accordance with any of the embodiments disclosed herein.
Figure 7:
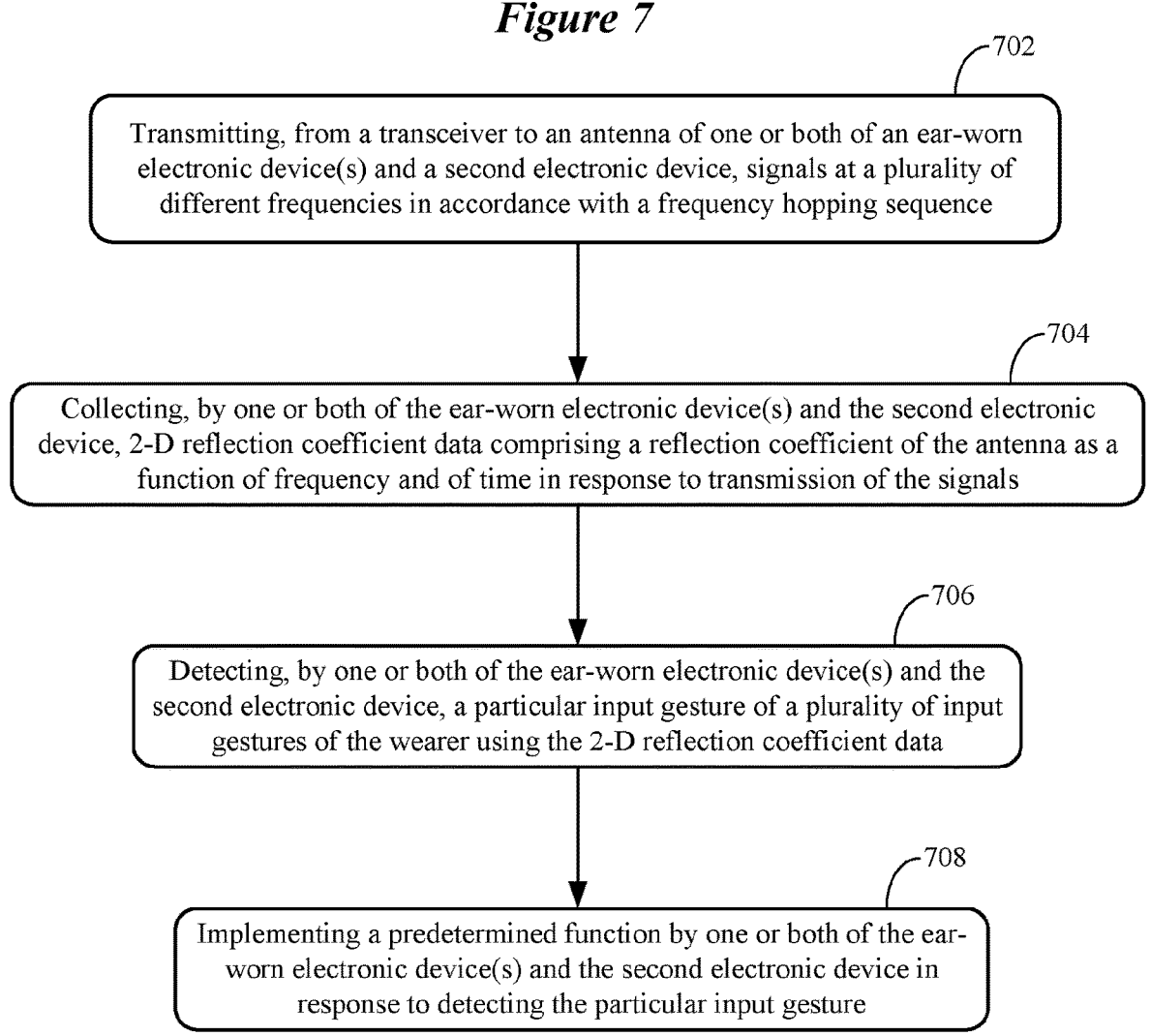
FIG. 7 illustrates a gesture control method using FHSS transmission implemented by one or both of an ear-worn electronic device and an accessory electronic device in accordance with any of the embodiments disclosed herein.

FIG. 6 illustrates a gesture control method using FHSS transmission implemented by one or both of an ear-worn electronic device and an accessory electronic device in accordance with any of the embodiments disclosed herein. The method shown in FIG. 6 involves transmitting 602, from one or both of the ear-worn electronic device and accessory electronic device(s), signals at a plurality of different frequencies in accordance with a frequency hopping sequence. The method involves collecting 604, by one or both of the ear-worn electronic device and accessory electronic device(s), 2-D RSSI data as a function of frequency and of time in response to transmission of the signals. The method also involves detecting 606, by one or both of the ear-worn electronic device and accessory electronic device(s), a particular input gesture of a plurality of input gestures of the wearer using the 2-D RSSI data. The method shown in FIG. 6 additionally involves detecting 608 the particular input gesture of the wearer using a sensor of one or both of the ear-worn electronic device and accessory electronic device(s). The sensor can comprise one or more of an accelerometer, a gyroscope, and an inertial measurement unit (IMU), for example. The method further involves implementing 610 a predetermined function of the ear-worn electronic device and/or accessory electronic device(s) in response to detecting the particular gesture using the 2-D RSSI data and data produced by the sensor.

As was discussed previously, embodiments of the disclosure exploit the perturbation of the creeping wave for detecting and characterizing movement and gestures of a hearing device wearer. As the environment surrounding the hearing device wearer varies, multi-path effects/dynamics can be taken into consideration. The electromagnetic wave not only creeps around the wearer's head, but also travels along/around the neck, shoulder, or reflects from the nearby objects (e.g., desk, wall, sunglasses). A crowded area is typically a challenging scenario. A cloud service can be accessed by the hearing devices and/or accessory device(s) in which environmental data can be considered and the environmental condition can be identified before the gesture detection. In addition, the propagation loss will vary with the operating frequency. At lower frequencies, the signal decays more slowly so there will be stronger signals adding constructively or destructively from multiple paths. At higher frequencies, the signal-to-noise ratio (SNR) is lower which affects the sensitivity. The frequency can be identified or selected before the detection to enhance gesture detection and classification.

If the hearing and/or accessory devices operate in the 2.4 GHz Bluetooth range, the default protocol utilizes adaptive frequency hopping (AFH) to mitigate potential in-band interference. The changing frequency adds complexity including large signal variation and longer processing time to implement RSSI-based motion recognition. To avoid or reduce processing delays, the protocol can be customized to set a fixed channel when the recognition mode is on. The fixed frequency setup also helps mitigate multi-path impact which occurs in an indoor environment where hearing devices may operate frequently.

With a fixed frequency, the phase difference between two signals can be determined by the time difference of arrival. A unique code sequence can be designed and embedded into the transmitted signal in various ways, and the signal arrival time can be calculated by correlating the received signal with the reference signal. This added phase difference can be used to improve the algorithm accuracy. The packet header, or other portions of packets, is another option since it already contains unique information.

An algorithm can look for a channel that is particularly sensitive to the wireless sensing function. For example, in a multi-path environment, a "creeping wave ear-to-ear null" may exist at a certain channel, and it may be most sensitive to S21 changes with a head/hand/finger movement. In addition, the algorithm can be applied when a wearer changes the head propagation environment (e.g., wearing glasses or a helmet). Alternatively, an algorithm can take advantage of the frequency hopping algorithm, as a fixed channel might not have the desired characteristic for a certain motion. The receiver scheme can be implemented by a single fixed channel, a single adaptive channel, multiple channels, multiple adaptive channels, or all channels. This can be part of the advertising channel, normal operation of the radio protocol, or an extension to the standard radio protocol (e.g. Continuous Wave, chirp etc.).

Further, Bluetooth® Low Energy (BLE) incorporates advertising channels and channels for a connection. The hearing system network can monitor the RSSI performance from the fixed channels used for advertising as well as the hopping channels used for a connection. This is advantageous in that the entire hearing system network can be used to detect wearer gestures. The advertisement channels are broadcast to all devices defining the hearing system network. Devices not in a connection can detect gestures and forward the information on through the hearing system network.

In accordance with any of the embodiments disclosed herein, one or both of the hearing devices and the accessory electronic device(s) can be configured to detect and classify wearer gestures made in proximity to the hearing device and/or accessory electronic device(s) using a single antenna and transceiver. When a wearer performs hand or finger motions, an antenna impedance monitor records the reflection coefficients of the signals or impedance. As the wearer's hand or finger moves, the changes in antenna impedance show unique patterns due to the perturbation of the antenna's electrical field or magnetic field. As the wearer's hand or finger moves closer to the hearing device, for example, a large perturbation of the antenna's electrical field occurs, resulting in a corresponding larger variation in the antenna's reflection coefficients (S11/S22) and impedance. Within a certain distance between the hand/finger and hearing device, as long as the wearer is performing a specific motion, the pattern of the reflection coefficient signals should be consistent, although the absolute value would likely be different due to signal decay along the distance. It is noted that wearer head shaking or nodding motions can also be monitored using a single antenna's reflection coefficient data. It is also noted that all links associated with the hearing system network can be monitored for the gesture.

According to any of the embodiments disclosed herein, the patterns of a wearer gesture consist of two-dimensional (2-D) S11 signals, in both time domain and frequency domain, that is, S11 vs. frequency and S11 vs. time (also referred to herein as 2-D reflection coefficient data). A gesture control system of the hearing device and/or accessory electronic device(s) processes, analyzes, and monitors the 2-D reflection coefficient data to detect wearer gestures. After detecting (and optionally verifying) a wearer gesture, the gesture control system informs a processor of the hearing device and/or accessory electronic device(s) that an input gesture has been received. In response, the processor can implement a particular device function or setting that corresponds to the detected input gesture.

For example, the hearing and/or accessory electronic device processor monitors 2-D reflection coefficient data to detect a wearer gesture that corresponds to one of a multiplicity of reference gestures developed for the wearer and/or for a population. The reference gestures can be stored in a memory of the hearing device, the accessory electronic device(s), and/or in cloud storage. After the 2-D S11 signals are collected by the hearing device and/or accessory electronic device(s), time-frequency analysis can be performed by the hearing device processor, the accessory electronic device processor, and/or a cloud processor to evaluate the feature differences between each wearer gesture. For example, a time-frequency spectrogram can be generated and analyzed by the hearing device processor, the accessory electronic device processor and/or a cloud processor to detect a wearer gesture. The time-frequency spectrogram can be a two-dimensional figure describing the frequency spectrum variation of the 2-D S11 signals with time. Several signal processing techniques can be applied, including a Fast Fourier transform (FFT), a continuous wavelet transform (CWT), a dynamic time warping (DTW) function, and an autocorrelation function.

A gesture control system of a hearing device and/or accessory electronic device(s) implemented in accordance with any of the embodiments disclosed herein is configured to collect and process two-dimensional (2-D) reflection coefficient data (e.g., S11 signals) in both time domain and frequency domain. By gathering S11 signals in both time domain and frequency domain, the gesture information detected by the hearing device and/or accessory electronic device(s) is significantly more reliable than conventional gesture detection approaches. Collecting and processing two-dimensional (2-D) reflection coefficient data (e.g., S11 signals) in both time domain and frequency domain by a gesture control system according to any of the embodiments disclosed herein significantly increases gesture detection accuracy and significantly reduces gesture detection challenges due to frequency-hopping variations.

As discussed previously, 2-D reflection coefficient data can be collected to characterize (e.g., develop signatures for) a multiplicity of gestures for one or more populations. The 2-D reflection coefficient signatures can be developed for a multiplicity of finger, hand, and head motions for an individual wearer, one or more populations, or a combination of an individual wearer and one or more populations. Each of these 2-D reflection coefficient signatures serves as a reference signal or reference signature (e.g., reference 2-D coefficient data). Each reference 2-D reflection signature corresponds to a particular input gesture of a multiplicity of input gestures that can be detected by the hearing device processor, accessory electronic device processor, and/or a cloud processor. The reference 2-D coefficient data can be pre-selected and stored in a memory of the hearing device, a memory of the accessory electronic device(s), and/or in cloud storage accessible by the hearing device and/or accessory electronic device(s). The collected 2-D reflection coefficient data can be post-processed using learning algorithms or statistical modeling. The trained data can then be compared with the reference 2-D reflection signature to determine whether or not event triggering is implemented (see, e.g., the methodology illustrated in FIG. 4). It is noted that signals not associated with gestures, e.g. walking, can be detected in the multitude of hearing system communication links of a hearing system network. These signals/data can be removed from the 2-D RSSI data providing additional accuracy in the detection of a gesture.

A correlation or pattern recognition methodology can be implemented by the processor of the hearing device, the processor of the accessory electronic device(s), and/or a cloud processor when comparing a detected gesture to a reference gesture. A representative methodology for comparing detected and reference gestures involves computing a correlation coefficient and comparing the result to a threshold indicative of a match. The reference gestures can be stored in cloud storage and updated by a multiplicity of hearing device wearers (one or more populations) over time. Updated reference gestures can be periodically downloaded from cloud storage to individual hearing devices to provide for improved gesture detection.

The hearing device and/or accessory electronic device processor may be configured to apply self-learning algorithms to adjust thresholds/signatures to improve (e.g., optimize) detection while reducing (e.g., minimizing) falsing. It is noted that falsing refers to a processor or decoder assuming that it is detecting a valid input when one is not present. Falsing is also known as a false decode. Falsing can result in a false positive, as previously mentioned. A false negative can also occur and is considered a false signal or falsing. A false negative would occur when a valid gesture occurs, but is not detected. The adaptive algorithm can also reduce false negatives.

Additionally, the wearer can customize his or her motion/gesture to align with a specific setting or function for wearer control. Gesture or motion training can be implemented either pre-embedded in the hearing device and/or accessory device(s) or conducted by the wearer (or both). For example, fitting software for the hearing device or a mobile application executed by a smartphone or tablet can be used to assist in gesture training. An adaptive algorithm can be implemented to sense nominal conditions vs. gestures/motions. An app can be used to assist hearing device wearers in training gestures (e.g. voice assistance). Additional details concerning collecting and processing of 2-D reflection coefficient data for purposes of detecting wearer gestures are disclosed in commonly owned, U.S. Application Ser. No. 62/875,139, filed on Jul. 17, 2019, which is incorporated herein in its entirety.

Figure 8:
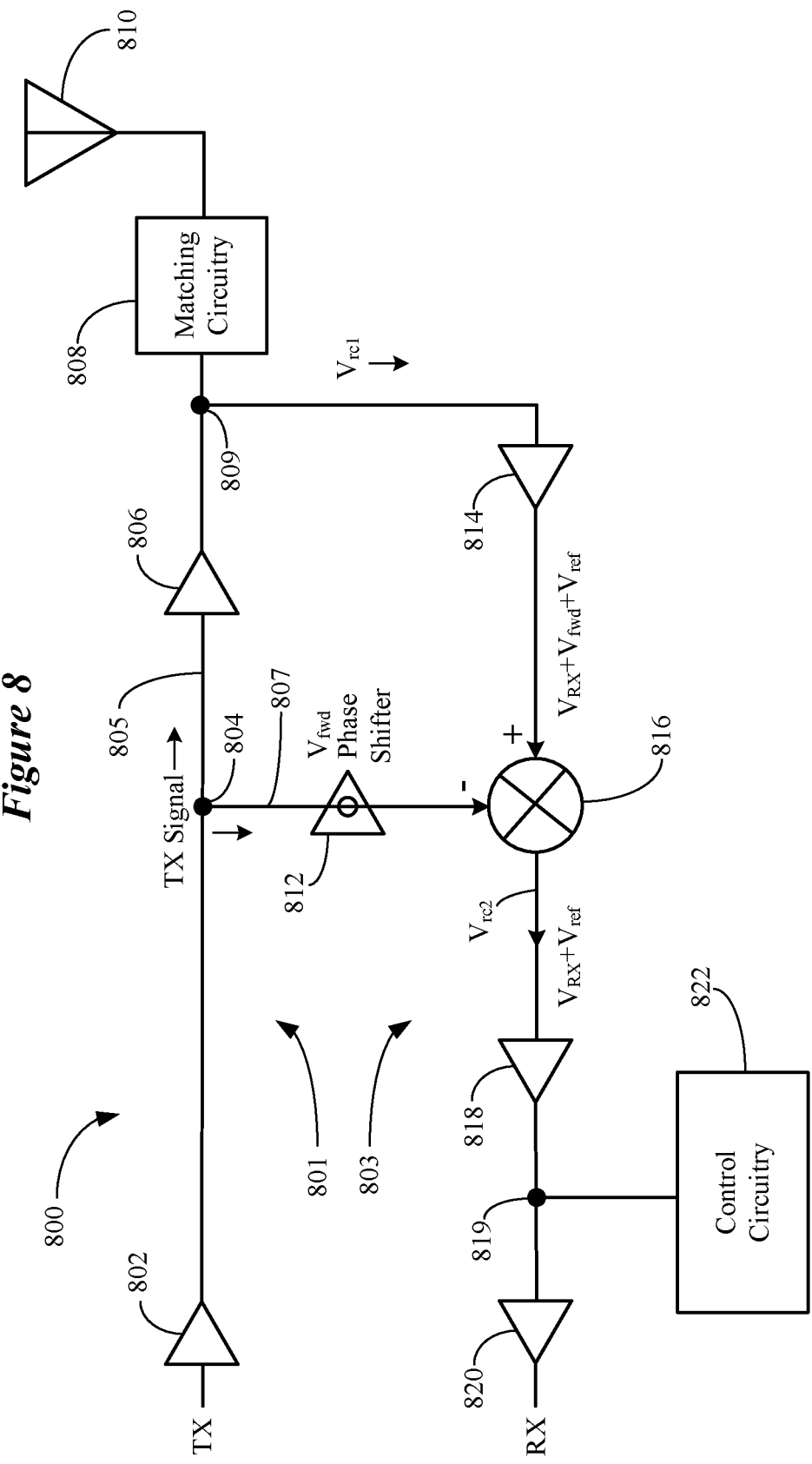
FIG. 8 illustrates a gesture control system of one or both of an ear-worn electronic device and an accessory electronic device that uses FHSS transmission implemented in accordance with any of the embodiments disclosed herein.

FIG. 8 illustrates a gesture control system of an ear-worn electronic device and/or an accessory electronic device(s) that uses FHSS transmission implemented in accordance with any of the embodiments disclosed herein. The gesture control system 800 shown in FIG. 8 includes a transmit channel 801 and a receive channel 803 respectively coupled to an antenna 810 via matching circuitry 808. The transmit channel 801 is configured to receive a transmit signal (TX signal) from a wireless transceiver (TX) configured to implement a frequency hopping methodology, such as FHSS, for transmission of radio signals via the antenna 810. As the frequency hops, the antenna input impedance changes. The adaptive matching circuitry 808 is configured to improve the antenna impedance match. At node 804, the transmit signal (TX signal) is communicated to the matching circuitry 808 and antenna 810 along a first path 805, and to a forward voltage phase shifter 812 along a second path 807. Amplifiers 802 and 806 are configured to record the forward voltages to the antenna 810 at locations of the transmit channel 801 prior to and after node 804 as shown.

The receive channel 803 receives a voltage signal $V_{rc1}$ from node 809. The voltage signal $V_{rc1}$ includes voltage components $V_{RX}$, $V_{fwd}$, and $V_{ref}$, where $V_{RX}$ is the receive signal voltage, $V_{fwd}$ is the forward voltage at node 809, and $V_{ref}$ is the reflected voltage from the antenna 810. The voltage signal $V_{rc1}$ is communicated to a summing junction 816. The summing junction 816 also receives the forward voltage $V_{fwd}$ from the phase shifter 812. The phase shifter 812 is adjusted by control circuitry 822 to optimize cancellation of the forward voltage $V_{fwd}$ from the voltage signal $V_{rc1}$. The summing junction 816 is configured to subtract the forward voltage $V_{fwd}$ from the voltage signal $V_{rc1}$ and output a voltage signal $V_{rc2}$. The voltage signal $V_{rc2}$ includes voltage components $V_{RX}$ and $V_{ref}$. At node 819, the reflected voltage $V_{ref}$ is communicated to control circuitry 822, and the received signal $V_{RX}$ is communicated to a receiver (RX) of the wireless transceiver. Amplifiers 814, 818, and 820 are configured to record the reflected voltages from the antenna 810 at locations of the receive channel 803 prior to and after detector 816 as shown. Advantageously, the gesture control system 800 provides for concurrent gesture detection and normal RF communications to/from the hearing device.

The control circuitry 822 is configured to perform a variety of functions for controlling the gesture control system 800. The control circuitry 822 can incorporate or be coupled to one or more processors of the hearing device (e.g., processor 102 shown in FIGS. 1A-1B). The control circuitry 822 is configured to provide control signals to adjust the phase shifter 812 to optimize cancellation of the forward voltage $V_{fwd}$ from the voltage signal $V_{rc1}$. The control circuitry 822 also receives the reflected voltage signal $V_{ref}$ and is configured to calculate 2-D reflection coefficient data using the reflected voltage signal $V_{ref}$ and the forward voltage $V_{fwd}$.

For example, the control circuitry 822 can be configured to compute the values of S11 as $V_{ref}/V_{fwd}$ as a function of time and of frequency as the frequency hops through its hopping sequence. The control circuitry 822 can store the 2-D reflection coefficient data in a memory as a matrix of S11 values as a function of time and of frequency computed by the control circuitry 822. The control circuitry 822 can also be configured to compare the forward and reflected voltages $V_{ref}$ and $V_{fwd}$ for each frequency in the hopping sequence. The control circuitry 822 can implement an algorithm that monitors the forward and reflected power of the antenna 810 and matching circuitry 808. The algorithm can be configured to adjust the match according to this real-time Voltage Standing Wave Ratio (VSWR).

The control circuitry 822 can control operation of the circuitry shown in FIG. 8 using two different time constants, namely, a slow time constant and a fast time constant. When operating in a slow time constant mode, the control circuitry 822 uses a slow time constant to optimize the antenna match implemented by the matching circuitry 808 for power transferring to the antenna 810. The slow time constant mode can involve a slow time constant that has a duration longer than a multiplicity of frequency hopping sequences and longer than the duration of a gesture. When operating in a fast time constant mode, the control circuitry 822 uses a fast time constant for gesture detection. The fast time constant mode can involve a fast time constant that is shorter in duration than a duration of the particular input gesture. During the fast time constant mode, the antenna match is not adjusted by the matching circuitry 808 in order to facilitate detection of electrical field perturbations due to finger, hand, and head gestures made by the wearer.

According to any of the embodiments disclosed herein, a hearing device which incorporates gesture detection and device control can be configured to operate in the Bluetooth® band (e.g., 2.4 GHz Bluetooth range). For hearing devices and/or an accessory electronic devices configured to operate in the Bluetooth® band, the default protocol utilizes adaptive frequency hopping (AFH) to mitigate potential in-band interference. The changing frequency adds complexity including large signal variation and longer processing time to implement the 2-D S11-parameter based gesture recognition. In this scenario, only channels in the current channel map are used for slow time constant matching and fast time constant gesture detection. Channel(s) condemned from the channel map by AFH may be used for slow time constant matching and fast time constant gesture detection, if these channels are more reliable.

Alternatively, an algorithm implemented by the hearing and/or accessory electronic device's gesture control system can take advantage of the frequency hopping algorithm, as a fixed channel might not have the desired characteristic for a certain gesture. The receiver scheme can be implemented by a single fixed channel, a single adaptive channel, multiple channels, multiple adaptive channels, or all channels. This can be part of the advertising channel, normal operation of the radio protocol, or an extension to the standard radio protocol (e.g. Continuous Wave, chirp, etc.). If a hearing device and/or an accessory electronic device(s) is not in the active connection, the advertising channels can be used for matching and gesture detection. If reliable gesture and matching is not viable with a limited channel map being used by the hearing device and/or an accessory electronic device(s), additional channels may be added for gesture detection.

FIG. 9 illustrates a gesture control system of an ear-worn electronic device and/or an accessory electronic device(s) that uses FHSS transmission implemented in accordance with any of the embodiments disclosed herein. The gesture control system 900 shown in FIG. 9 is configured to extract 2-D reflection coefficient data (2-D S11) by monitoring the antenna impedance. The antenna's input impedance can be measured using the circuitry shown in FIG. 9, which can be an integrated circuit in the form of a Wheatstone Bridge, for example.

The gesture control system 900 illustrated in FIG. 9 includes an RF transceiver 902 (e.g., an RF chip transceiver), three resistors $R_1$, $R_2$, $R_3$ (e.g., each being 50-Ohm resistors), two voltmeters 910, 912, and an antenna 908. The gesture control system 900 also includes a first switch 904 and a second switch 906. The first switch 904 is a normally-open single pole single throw (SPST) switch, and the second switch 906 is a normally-closed single pole single throw (SPST) switch. In a normal operating mode, the transceiver 902 directly connects to the antenna 908 for EM transmission purposes. In the normal operating mode, the first switch 904 is open and the second switch 906 is closed, such that the antenna impedance measuring circuitry of the gesture control system 900 is disconnected/disabled.

In a non-normal (measuring) mode, the transceiver 902 connects to the resistors $R_2$, $R_3$, forming a bridge circuit. The voltmeter 910 is used to measure the voltage, $V_{fwd}$, across one of the 50-Ohm resistors (e.g., $R_3$). The voltmeter 910 is applied to measure the electrical potential difference between the resistor $R_3$ and the antenna 908. A minimum voltage, $V_{rev}$, measured by the voltmeter 912 indicates that the antenna's impedance is closest to the 50 Ohms, for the best match. Using the voltage values measured by the voltmeters 910, 912, the antenna's impedance and mismatch can be calculated, such as by a logic device or processor 920.

The logic device or processor 920 (e.g., processor 102A, 102B in FIGS. 1D-1E or other processor) can be configured to compute the values of S11 as $V_{ref}/V_{fwd}$ (as measured by voltmeters 910, 912) as a function of time and of frequency as the frequency hops through its hopping sequence. The logic device or processor 920 can store the 2-D reflection coefficient data in a memory as a matrix of S11 values computed as a function of time and of frequency.

It is noted that, in order to measure the actual antenna impedance value including the reactive element, a modification of the circuitry shown in FIG. 9 can be made. For example, a Maxwell or Wien Bridge circuit can be utilized to measure the unknown resistance, inductance or capacitance ($Z_{ANT}$ of antenna 908). It is further noted that the gesture control system illustrated in FIG. 9 provides for alternating gesture detection and normal RF communications to/from the hearing device and/or accessory electronic device(s). In addition to using 2-D RSSI data to detect and classify gestures, one or both of the hearing devices and/or the accessory electronic device(s) can be configured to provide enhanced features using both 2-D RSSI data and 2-D reflection coefficient data. For example, signals can be transmitted at a plurality of different frequencies in accordance with a frequency hopping sequence from one or both of a first ear-worn electronic device and a second electronic device. The second electronic device can be a second ear-worn electronic device or an accessory electronic device held by, worn on or situated proximate the wearer. 2-D RSSI data and 2-D reflection coefficient data can be collected from one or both of the first ear-worn electronic device and the second electronic device. The 2-D RSSI data comprises an RSSI value as a function of frequency and of time in response to transmission of the signals. The 2-D reflection coefficient data comprises a reflection coefficient of the antenna as a function of frequency and of time in response to transmission of the signals. The 2-D RSSI data and 2-D reflection coefficient data can be used to provide robust detection and classification of wearer movements.

According to one representative method, a particular input gesture of the wearer is detected using the 2-D RSSI data and the 2-D reflection coefficient data. The method involves confirming, by at least one of the first ear-worn electronic device and the second electronic device, successful detection of the particular input gesture using the 2-D RSSI data and the 2-D reflection coefficient data. For example, the 2-D RSSI data can be used to detect the particular input gesture, and the 2-D reflection coefficient data can be used to verify or confirm that the particular input gesture was indeed performed by the wearer. Alternatively, the 2-D reflection coefficient data can be used to detect the particular input gesture, and the 2-D RSSI data can be used to verify or confirm that the particular input gesture was indeed performed by the wearer.

According to another representative method, a particular input gesture or other input gesture of the wearer is detected using the 2-D RSSI data and the 2-D reflection coefficient data. The method involves implementing a first function of at least one of the first ear-worn electronic device and the second electronic device in response to detecting the particular input gesture using the 2-D RSSI data. The method also involves implementing a second function of at least one of the first ear-worn electronic device and the second electronic device in response to detecting the particular input gesture or the other input gesture using the 2-D reflection coefficient data. Alternatively, the first function can be implemented in response to detecting the particular input gesture using the 2-D reflection coefficient data, and the second function can be implemented in response to detecting the particular input gesture or the other input gesture using the 2-D RSSI data.

According to a further representative method, an activation input gesture of the wearer is detected using the 2-D reflection coefficient data. The method involves initiating detection of a particular input gesture using the 2-D RSSI data in response to the activation input gesture. An alternative representative method involves detecting an activation input gesture of the wearer using the 2-D RSSI data. The method also involves initiating detection of a particular input gesture using the 2-D reflection coefficient data in response to the activation input gesture.

In another representative method, an activation input gesture of the wearer is detected using 2-D RSSI data. In response to the activation input gesture, the method involves collecting, from one or both of the first ear-worn electronic device and the second electronic device, 2-D reflection coefficient data, detecting a particular input gesture or other input gesture of the wearer using the 2-D reflection coefficient data, and implementing a function of at least one of the first ear-worn electronic device and the second electronic device in response to detecting the particular input gesture or the other input gesture using the 2-D reflection coefficient data.

According to an alternative representative method, an activation input gesture of the wearer is detected using 2-D reflection coefficient data. In response to the activation input gesture, the method involves collecting, from one or both of the first ear-worn electronic device and the second electronic device, 2-D RSSI data, detecting a particular input gesture or other input gesture of the wearer using the 2-D RSSI data, and implementing a function of at least one of the first ear-worn electronic device and the second electronic device in response to detecting the particular input gesture or the other input gesture using the 2-D RSSI data.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electromagnetic signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of" "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. A system, comprising:
    a first ear-worn electronic device configured to be worn by a wearer;
    a second electronic device comprising a second ear-worn electronic device or other electronic device;
    a wireless transceiver operably coupled to an antenna disposed in each of the electronic devices, wherein one or both of the first ear-worn electronic device and the second electronic device are configured to:
        transmit signals at a plurality of different frequencies in accordance with a frequency hopping sequence;
        collect two-dimensional (2-D) RSSI (Received Signal Strength Indication) data comprising an RSSI value as a function of frequency and of time in response to transmission of the signals;
        detect a particular input gesture of a plurality of input gestures of the wearer using the 2-D RSSI data; and
        implement a predetermined function of at least one of the first ear-worn electronic device and the second electronic device in response to detecting the particular input gesture.

2. The system of claim 1, wherein:
    the second electronic device comprises the second ear-worn electronic device;
    the 2-D RSSI data comprises ear-to-ear 2-D RSSI data measured by one or both of the first and second ear-worn electronic devices;
    the particular input gesture of the wearer is detected by one or both of the first and second ear-worn electronic devices using the ear-to-ear 2-D RSSI data; and
    the predetermined function is implemented by one or both of the first and second ear-worn electronic devices in response to detecting the particular input gesture.

3. The system of claim 1, wherein:
    the second electronic device comprises the second ear-worn electronic device which is configured to transmit the signals at the plurality of different frequencies in accordance with the frequency hopping sequence; and
    the first ear-worn electronic device is configured to collect the 2-D RSSI data, detect the particular input gesture using the 2-D RSSI data, and implement the predetermined function in response to detecting the particular input gesture.

4. The system of claim 1, wherein:
    the first ear-worn electronic device is configured to transmit the signals at the plurality of different frequencies in accordance with the frequency hopping sequence;
    the second electronic device comprises an accessory electronic device; and
    the accessory electronic device is configured to collect the 2-D RSSI data and detect the particular input gesture using the 2-D RSSI data.

5. The system of claim 4, wherein:
    the accessory electronic device is configured to:
        implement the predetermined function in response to detecting the particular input gesture; or
        transmit a signal to one or both of the first ear-worn electronic device and the second ear-worn electronic device in response to detecting the particular input gesture; and
    one or both of the first ear-worn electronic device and the second ear-worn electronic device is configured to implement the predetermined function in response to the signal transmitted by the accessory electronic device.

6. The system of claim 1, wherein:
    the first ear-worn electronic device and a plurality of second electronic devices collectively define a hearing system network comprising a plurality of wireless links;
    the 2-D RSSI data is collected from each of the wireless links; and
    the particular input gesture is detected by one or more of the electronic devices defining the hearing system network using the 2-D RSSI data collected from one or more of the wireless links.

7. The system of claim 4, wherein:
    the second electronic device comprises the second ear-worn electronic device;
    one or both of the first and second ear-worn electronic devices implements the predetermined function in response to detecting the particular input gesture; and
    the predetermined function comprises one or both of detecting and tracking one or more of a physiologic signal, a physiologic condition or a personal habit of the wearer.

8. The system of claim 1, wherein one or both of the first ear-worn electronic device and the second electronic device are configured to:
    detect the particular input gesture by comparing the collected 2-D RSSI data to reference 2-D RSSI data indicative of the plurality of input gestures; and
    the reference 2-D RSSI data is stored:
        in a memory of one or both of the first the ear-worn electronic device and the accessory electronic device; or
        in a memory of an external server communicatively coupled to one or both of the first ear-worn electronic device and the accessory electronic device.

9. The system of claim 1, wherein one or both of the first ear-worn electronic device and the second electronic device are configured to:
    collect, from one or both of the first ear-worn electronic device and the second electronic device, 2-D reflection coefficient data as a function of frequency and of time in response to transmission of the signals;
    detect the particular input gesture of the wearer using one of the 2-D RSSI data and the 2-D reflection coefficient data; and
    confirm, by at least one of the first ear-worn electronic device and the second electronic device, successful detection of the particular input gesture using the other of the 2-D RSSI data and the 2-D reflection coefficient data.

10. The system of claim 1, wherein one or both of the first ear-worn electronic device and the second electronic device are configured to:
- generate a request perceivable by the wearer for a confirmation input prior to initiating the predetermined function; and
- implement the predetermined function in response to detecting the confirmation input provided by the wearer.

11. A method using a first ear-worn electronic device worn by a wearer and wirelessly coupled to at least a second electronic device, each of the electronic devices comprising a wireless transceiver operably coupled to an antenna, the method comprising:
- transmitting, from one or both of the first ear-worn electronic device and the second electronic device, signals at a plurality of different frequencies in accordance with a frequency hopping sequence;
- collecting, from one or both of the first ear-worn electronic device and the second electronic device, two-dimensional (2-D) RSSI (Received Signal Strength Indication) data comprising an RSSI value as a function of frequency and of time in response to transmission of the signals;
- detecting a particular input gesture of a plurality of input gestures of the wearer using the 2-D RSSI data; and
- implementing a predetermined function of at least one of the first ear-worn electronic device and the second electronic device in response to detecting the particular input gesture.

12. The method of claim 11, wherein:
- the second electronic device comprises a second ear-worn electronic device;
- the 2-D RSSI data comprises ear-to-ear 2-D RSSI data measured by one or both of the first and second ear-worn electronic devices;
- the particular input gesture of the wearer is detected by one or both of the first and second ear-worn electronic devices using the ear-to-ear 2-D RSSI data; and
- the predetermined function is implemented by one or both of the first and second ear-worn electronic devices in response to detecting the particular input gesture.

13. The method of claim 11, wherein:
- the first ear-worn electronic device transmits the signals at the plurality of different frequencies in accordance with the frequency hopping sequence;
- the second electronic device comprises an accessory electronic device;
- the accessory electronic device collects the 2-D RSSI data and detects the particular input gesture using the 2-D RSSI data; and
  - the accessory electronic device implements the predetermined function in response to detecting the particular input gesture; or
  - the accessory electronic device transmits a signal to one or both of the first ear-worn electronic device and the second ear-worn electronic device in response to detecting the particular input gesture, and one or both of the first ear-worn electronic device and the second ear-worn electronic device implements the predetermined function in response to the signal transmitted by the accessory electronic device.

14. The method of claim 11, wherein:
- detecting the particular input gesture comprises comparing the collected 2-D RSSI data to reference 2-D RSSI data indicative of the plurality of input gestures; and
- the reference 2-D RSSI data is received from:
  - a memory of one or both of the first the ear-worn electronic device and an accessory electronic device; or
  - a memory of an external server communicatively coupled to one or both of the first ear-worn electronic device and the accessory electronic device.

15. The method of claim 11, comprising:
- generating a request perceivable by the wearer for a confirmation input prior to initiating the predetermined function; and
- implementing the predetermined function in response to detecting the confirmation input provided by the wearer.

16. A system, comprising:
- a first body-worn electronic device configured to be worn by a wearer;
- a second electronic device;
- a wireless transceiver operably coupled to an antenna disposed in each of the electronic devices, wherein one or both of the first body-worn electronic device and the second electronic device are configured to:
  - transmit signals at a plurality of different frequencies in accordance with a frequency hopping sequence;
  - collect two-dimensional (2-D) RSSI (Received Signal Strength Indication) data comprising an RSSI value as a function of frequency and of time in response to transmission of the signals;
  - detect a particular input gesture of a plurality of input gestures of the wearer using the 2-D RSSI data; and
  - implement a predetermined function of at least one of the first body-worn electronic device and the second electronic device in response to detecting the particular input gesture.

17. The system of claim 16, wherein:
- the first body-worn electronic device is a first ear-worn electronic device; and
- the second electronic device is a second ear-worn electronic device.

18. The system of claim 16, wherein:
- the first body-worn electronic device is an ear-worn electronic device; and
- the second electronic device is an accessory electronic device.

19. The system of claim 16, wherein the second electronic device comprises a source of digital audio data or a source of data files.

20. The system of claim 16, wherein the second electronic device comprises one or more of an assistive listening system, a TV streamer, a radio, a smartphone, a laptop, and a cell phone/entertainment device (CPED).

* * * * *